United States Patent
Dong et al.

(10) Patent No.: US 11,431,541 B2
(45) Date of Patent: Aug. 30, 2022

(54) DATA SENDING METHOD AND APPARATUS

(71) Applicant: HUAWEI TECHNOLOGIES CO., LTD., Shenzhen (CN)

(72) Inventors: Pengpeng Dong, Shanghai (CN); Yuanjie Li, Shanghai (CN); Shengyue Dou, Shanghai (CN); Zijie Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/232,430

(22) Filed: Apr. 16, 2021

(65) Prior Publication Data

US 2021/0234743 A1 Jul. 29, 2021

Related U.S. Application Data

(63) Continuation of application No. PCT/CN2019/107833, filed on Sep. 25, 2019.

(30) Foreign Application Priority Data

Oct. 19, 2018 (CN) .......................... 201811224548.9

(51) Int. Cl.
*H04L 27/26* (2006.01)
*H04L 5/00* (2006.01)
*H04W 72/04* (2009.01)

(52) U.S. Cl.
CPC ........ *H04L 27/2627* (2013.01); *H04L 5/0026* (2013.01); *H04W 72/042* (2013.01)

(58) Field of Classification Search
CPC ..... H04L 5/0026; H04L 1/0031; H04L 27/34; H04L 27/3405; H04L 27/2627; H04L 1/0009; H04L 1/0003; H04W 72/042
See application file for complete search history.

(56) References Cited

U.S. PATENT DOCUMENTS

| | | | |
|---|---|---|---|
| 8,934,581 B2 | 1/2015 | Samuel Bebawy et al. | |
| 9,490,940 B2* | 11/2016 | Lilleberg | H04L 1/1845 |
| 10,153,864 B2* | 12/2018 | Mohamad | H04L 1/0041 |
| 10,680,754 B2* | 6/2020 | Mohamad | H04L 1/1819 |

(Continued)

FOREIGN PATENT DOCUMENTS

| | | |
|---|---|---|
| CN | 101431357 A | 5/2009 |
| CN | 106612136 A | 5/2017 |

OTHER PUBLICATIONS

Extended European Search Report issued in corresponding European Application No. 19873491.5, dated Oct. 22, 2021, pp. 1-8, European Patent Office, Munich, Germany.

*Primary Examiner* — Jaison Joseph
(74) *Attorney, Agent, or Firm* — Hauptman Ham, LLP

(57) ABSTRACT

This application provides a data sending method and an apparatus. The method includes performing, by a node, soft modulation to generate a modulation symbol. The method also includes preprocessing, by the node, the modulation symbol to obtain to-be-sent data. The preprocessing includes one or more of layer mapping, antenna port mapping, precoding, or transform precoding. The method further includes mapping, by the node, the to-be-sent data to a physical resource, and sending the to-be-sent data by way of the physical resource.

17 Claims, 15 Drawing Sheets

A node generates a modulation symbol based on first data and/or second data, where the modulation symbol and the first data and/or the second data satisfy a mapping relationship. The first data includes one or more first real numbers, and the first real number is greater than 0 and less than 1. The second data includes one or more second real numbers, and the second real number is greater than −1 and less than 1 — 400

The node preprocesses the modulation symbol to obtain fourth data, where the preprocessing includes one or more of layer mapping, antenna port mapping, precoding, or transform precoding — 410

The node maps the fourth data to a physical resource, and sends the fourth data on the physical resource — 420

(56) References Cited

U.S. PATENT DOCUMENTS

| | | | |
|---|---|---|---|
| 2010/0284448 A1* | 11/2010 | Miyoshi | H04B 7/155 |
| | | | 375/214 |
| 2011/0044379 A1* | 2/2011 | Lilleberg | H04L 1/1845 |
| | | | 375/211 |
| 2011/0222618 A1* | 9/2011 | Huss | H04L 27/38 |
| | | | 375/261 |
| 2013/0250776 A1* | 9/2013 | Hatefi | H04L 1/244 |
| | | | 370/243 |
| 2014/0362942 A1 | 12/2014 | Wood et al. | |
| 2016/0013889 A1 | 1/2016 | Cao et al. | |
| 2016/0359581 A1* | 12/2016 | Mohamad | H04L 1/0077 |
| 2017/0331584 A1* | 11/2017 | Visoz | H04L 1/0048 |
| 2018/0042004 A1 | 2/2018 | Beluri et al. | |
| 2019/0007068 A1* | 1/2019 | Arditti Ilitzky | H03M 13/2993 |
| 2020/0134415 A1* | 4/2020 | Haidar | G06N 3/0472 |
| 2020/0195371 A1* | 6/2020 | Tang | H04W 28/0284 |
| 2021/0288847 A1* | 9/2021 | Dong | H04L 1/0003 |
| 2021/0383190 A1* | 12/2021 | Park | G06N 3/04 |

\* cited by examiner

```
┌─────────────────────────────────────────────────────────────┐
│ A node generates a modulation symbol based on first data and/or second data, │
│ where the modulation symbol and the first data and/or the second data satisfy a │
│ mapping relationship. The first data includes one or more first real numbers, and │         400
│ the first real number is greater than 0 and less than 1. The second data includes │
│ one or more second real numbers, and the second real number is greater than −1 │
│                        and less than 1                                        │
└─────────────────────────────────────────────────────────────┘
                                    │
                                    ▼
┌─────────────────────────────────────────────────────────────┐
│ The node preprocesses the modulation symbol to obtain fourth data, where the │
│ preprocessing includes one or more of layer mapping, antenna port mapping,    │         410
│              precoding, or transform precoding                                │
└─────────────────────────────────────────────────────────────┘
                                    │
                                    ▼
┌─────────────────────────────────────────────────────────────┐
│ The node maps the fourth data to a physical resource, and sends the fourth data on │   420
│                      the physical resource                                    │
└─────────────────────────────────────────────────────────────┘
```

FIG. 4

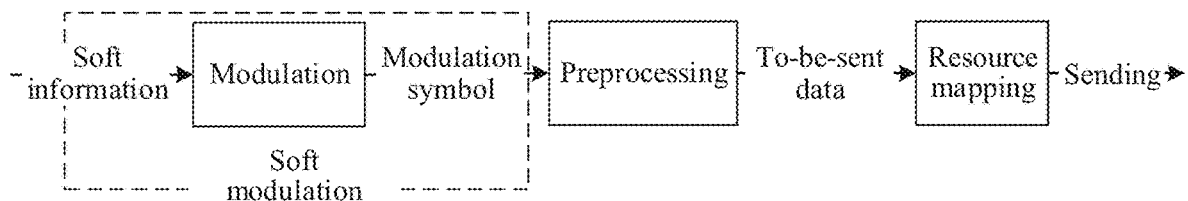

FIG. 5

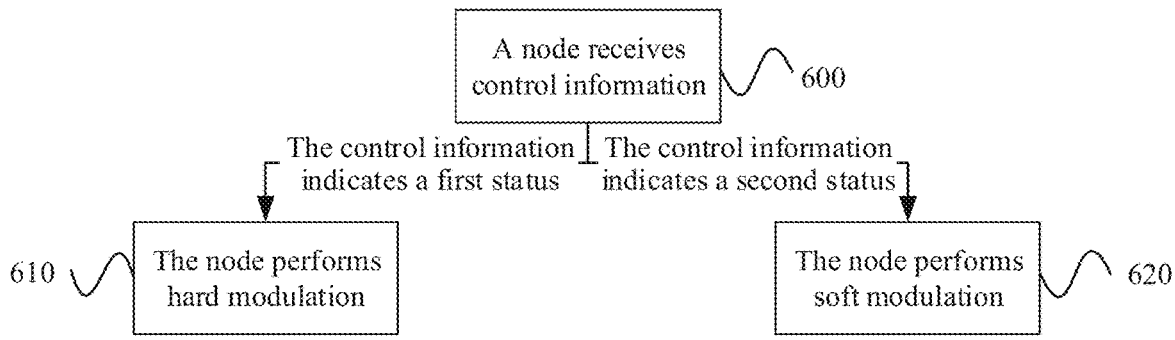

FIG. 6

DATA SENDING METHOD AND APPARATUS

CROSS-REFERENCE TO RELATED APPLICATIONS

This application is a continuation of International Application No. PCT/CN2019/107833, filed on Sep. 25, 2019, which claims priority to Chinese Patent Application No. 201811224548.9, filed on Oct. 19, 2018. The disclosures of the aforementioned applications are hereby incorporated by reference in their entireties.

TECHNICAL FIELD

This application relates to the field of communication technologies, and in particular, to a data sending method and an apparatus.

BACKGROUND

A conventional data forwarding manner includes decoding forwarding (DF). In the DF manner, after receiving data from a previous sending node, a forwarding node needs to demodulate and decode the data, and then determine, depending on whether the decoding is correct, whether to forward the data. If the decoding is correct, the forwarding node may encode and modulate decoded data again, and send, to a next receiving node, the decoded data on which the encoding and modulation have been performed. A main problem of the DF manner is that, in the DF manner, when a forwarding node incorrectly decodes data of a previous sending node, the forwarding node cannot forward the data, thereby reducing forwarding performance. Therefore, how to design data sending to improve the forwarding performance becomes an urgent problem to be resolved.

SUMMARY

Embodiments of this application provide a data sending method and an apparatus.

According to a first aspect, an embodiment of this application provides a data sending method, including:

A node generates a modulation symbol based on first data and/or second data, where the modulation symbol satisfies a mapping relationship with the first data and/or the second data.

The first data includes one or more first real numbers, and the first real number is greater than 0 and less than 1.

The second data includes one or more second real numbers, and the second real number is greater than −1 and less than 1.

The node preprocesses the modulation symbol to obtain fourth data, where the preprocessing includes one or more of layer mapping, antenna port mapping, precoding, or transform precoding.

The node maps the fourth data to a physical resource, and sends the fourth data on the physical resource.

In the first aspect, the generating a modulation symbol based on first data and/or second data may also be understood as inputting the first data and/or the second data to generate the modulation symbol.

According to the data sending method provided in this embodiment of this application, data generated through soft modulation is sent, so that when a forwarding node incorrectly decodes data of a previous sending node, the forwarding node can still forward the data, thereby improving forwarding performance.

Optionally, the mapping relationship that the modulation symbol satisfies with the first data and/or the second data is one of the following:

$\tilde{Q}=1/\sqrt{2}\times[(1-2\tilde{b}_0)+j(1-2\tilde{b}_0)]$, where $\tilde{b}_0$ is a first real number included in the first data, $\tilde{Q}$ is the modulation symbol, and $j$ is an imaginary unit; or $\tilde{Q}=1/\sqrt{2}\times[(1-2\tilde{b}_0)+j(1-2\tilde{b}_1)]$, where $\tilde{b}_0$ and $\tilde{b}_1$ are two first real numbers included in the first data, $\tilde{Q}$ is the modulation symbol, and $j$ is an imaginary unit; or $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where $\tilde{b}_0$, $\tilde{b}_1$, $\tilde{b}_2$, and $\tilde{b}_3$ are four first real numbers included in the first data, $\tilde{Q}$ is the modulation symbol, and $j$ is an imaginary unit; or $\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where $\tilde{b}_0$, $\tilde{b}_1$, $\tilde{b}_2$, $\tilde{b}_3$, $\tilde{b}_4$, and $\tilde{b}_5$ are six first real numbers included in the first data, $\tilde{Q}$ is the modulation symbol, and $j$ is an imaginary unit; or $\tilde{Q}=1/\sqrt{2}\times[\tilde{a}_0+j\tilde{a}_0]$, where $\tilde{a}_0$ is a second real number included in the second data, $\tilde{Q}$ is the modulation symbol, and $j$ is an imaginary unit; or $\tilde{Q}=1/\sqrt{2}\times[\tilde{a}_0+j\tilde{a}_1]$, where $\tilde{a}_0$ and $\tilde{a}_1$ are two second real numbers included in the second data, $\tilde{Q}$ is the modulation symbol, and $j$ is an imaginary unit; or $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where $\tilde{a}_0$, $\tilde{a}_1$, $\tilde{a}_2$, and $\tilde{a}_3$ are four second real numbers included in the second data, $\tilde{Q}$ is the modulation symbol, and $j$ is an imaginary unit; or $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where $\tilde{a}_0$, $\tilde{a}_1$, $\tilde{a}_2$, $\tilde{a}_3$, $\tilde{a}_4$, and $\tilde{a}_5$ are six second real numbers included in the second data, $\tilde{Q}$ is the modulation symbol, and $j$ is an imaginary unit; or $\tilde{Q}=1/\sqrt{2}\times[(1-2\tilde{b}_0)+j\tilde{a}_1]$, where $\tilde{b}_0$ is a first real number included in the first data, $\tilde{a}_1$ is a second real number included in the second data, $\tilde{Q}$ is the modulation symbol, and $j$ is an imaginary unit; or $\tilde{Q}=1/\sqrt{10}\times\{(1-2\tilde{b}_0)[2-\tilde{a}_2]+j(1-2\tilde{b}_1)[2-\tilde{a}_3]\}$, where $\tilde{b}_0$ and $\tilde{b}_1$ are two first real numbers included in the first data, $\tilde{a}_2$ and $\tilde{a}_3$ are two second real numbers included in the second data, $\tilde{Q}$ is the modulation symbol, and $j$ is an imaginary unit.

Optionally, the first data further includes one or more third real numbers, and the third real number is equal to 0 or 1. The second data further includes one or more fourth real numbers, and the fourth real number is equal to −1 or 1. Further optionally, the mapping relationship that the modulation symbol satisfies with the first data and/or the second data is one of the following:

$\tilde{Q}=1/\sqrt{2}\times[(1-2\tilde{b}_0)+j(1-2\tilde{b}_1)]$, where one of $\tilde{b}_0$ and $\tilde{b}_1$ is a first real number included in the first data, the other one is a third real number included in the first data, $\tilde{Q}$ is the modulation symbol, and $j$ is an imaginary unit; or $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where a part of $\tilde{b}_0$, $\tilde{b}_1$, $\tilde{b}_2$, and $\tilde{b}_3$ is a first real number included in the first data, the other part is a third real number included in the first data, $\tilde{Q}$ is the modulation symbol, and $j$ is an imaginary unit; or $\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where a part of $\tilde{b}_0$, $\tilde{b}_1$, $\tilde{b}_2$, $\tilde{b}_3$, $\tilde{b}_4$, and $\tilde{b}_5$ is a first real number included in the first data, the other part is a third real number included in the first data, $\tilde{Q}$ is the modulation symbol, and $j$ is an imaginary unit; or $\tilde{Q}=1/\sqrt{2}\times[\tilde{a}_0+j\tilde{a}_1]$, where one of $\tilde{a}_0$ and $\tilde{a}_1$ is a second real number included in the second data, the other one is a fourth real number included in the second data, $\tilde{Q}$ is the modulation symbol, and $j$ is an imaginary unit; or $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where a part of $\tilde{a}_0$, $\tilde{a}_1$, $\tilde{a}_2$, and $\tilde{a}_3$ is a second real number included in the second data, the other part is a fourth real number included in the second data, $\tilde{Q}$ is the modulation symbol, and j is an imaginary unit; or $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where a part of $\tilde{a}_0$, $\tilde{a}_1$, $\tilde{a}_2$, $\tilde{a}_3$, $\tilde{a}_4$, and $\tilde{a}_5$ is a second real number included in the second data, the other part is a fourth real number included in the second data, $\tilde{Q}$ is the modulation symbol, and j is an imaginary unit.

In the foregoing implementation provided in this embodiment of this application, the soft modulation may be implemented by using a modulation scheme of binary phase shift keying (BPSK), quadrature phase shift keying (QPSK), 16 quadrature amplitude modulation (16QAM), or 64 quadrature amplitude modulation (64QAM), thereby reducing implementation complexity of the soft modulation.

Optionally, the node quantizes third data to obtain the first data and/or the second data. According to the implementation provided in this embodiment of this application, original soft information obtained by the forwarding node and that has a relatively large value range may be mapped to an interval with a relatively small value range, so that modulation complexity can be reduced.

Optionally, the node obtains the first data and/or the second data based on third data. The third data and the first data satisfy $\tilde{b}_i = e^L/(1+e^L)$, where L is the third data, and $\tilde{b}_i$ is the first data. The third data and the second data satisfy $\tilde{a}_i = -\tan h(L/2)$, where L is the third data, and $\tilde{a}_i$ is the second data. According to the implementation provided in this embodiment of this application, the original soft information obtained by the forwarding node and that has the relatively large value range may be mapped to the interval with the relatively small value range, so that the modulation complexity can be reduced.

Optionally, the node receives control information, and determines, based on the control information, to generate the modulation symbol based on the first data and/or the second data. Further optionally, the node further determines, based on a code check result, to generate the modulation symbol based on the first data and/or the second data. In an implementation of the control information, the control information includes modulation scheme indication information and/or identification information of the node, the identification information of the node indicates the node, and the modulation scheme indication information indicates to generate the modulation symbol based on the first data and/or the second data. Optionally, the control information is included in one or more of a reserved field, a modulation and coding scheme indication field, or a bandwidth part (BWP) indication field in downlink control information (DCI). In the foregoing implementation provided in this embodiment of this application, when the hard modulation and the soft modulation coexist, the node can be notified to use a proper modulation scheme, thereby improving the robustness of data sending.

According to a second aspect, this application provides a communications apparatus, to implement one or more corresponding functions of the node in the first aspect. The communications apparatus includes a corresponding unit or component configured to perform the foregoing method. The unit included in the communications apparatus may be implemented by software and/or hardware. For example, the communications apparatus may be a terminal, a network device (for example, a base station), or a chip, chip system, processor, or the like that can support a terminal or network device in implementing the foregoing functions.

According to a third aspect, this application provides a communications apparatus, including a processor. The processor is coupled to a memory, and the memory is configured to store a program. When the program is executed by the processor, the communications apparatus is enabled to implement the method according to the first aspect.

According to a fourth aspect, this application provides a storage medium, where the storage medium stores a computer program, and the computer program is executed by a processor, to implement the method according to the first aspect.

According to a fifth aspect, this application provides a chip system, including a processor, configured to perform the method described in the first aspect.

BRIEF DESCRIPTION OF DRAWINGS

FIG. 4 is a flowchart of a data sending method according to an embodiment of this application;

FIG. 5 is a schematic diagram of performing soft modulation and sending a modulation symbol generated through soft modulation according to an embodiment of this application;

FIG. 6 is a flowchart of indicating, by using control information, a node to perform soft modulation according to an embodiment of this application;

DESCRIPTION OF EMBODIMENTS

Figure 1:
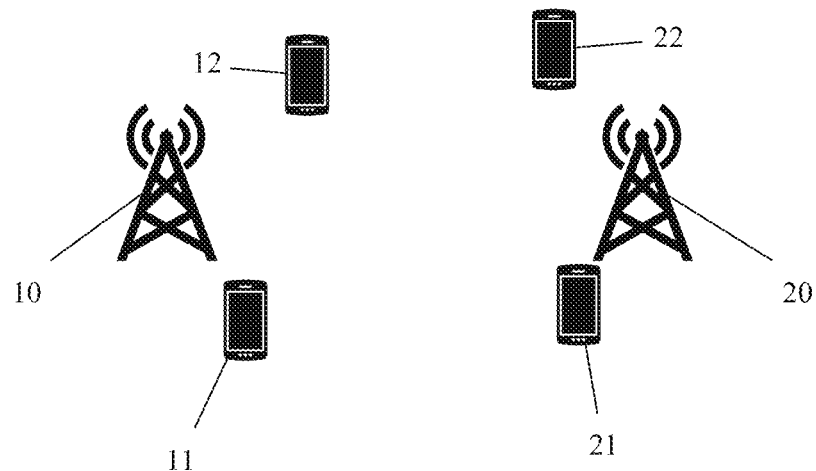
FIG. 1 is a schematic diagram of a communications system that is used according to an embodiment of this application.

A data sending method and an apparatus provided in embodiments of this application may be used in a communications system. FIG. 1 is a schematic structural diagram of a communications system. The communications system includes one or more network devices (where for clarity, a network device 10 and a network device 20 are shown in the figure), and one or more terminal devices that communicate with the one or more network devices. In FIG. 1, a terminal device 11 and a terminal device 12 communicate with the network device 10, and a terminal device 21 and a terminal device 22 communicate with the network device 20.

The technologies described in the example embodiments may be used in various communications systems, for example, 2G, 3G, 4G, 4.5G, and 5G communications systems, a system in which a plurality of communications systems are integrated, or a future evolved network. The communications systems include, for example, a long term evolution (LTE) system, a new radio (NR) system, a wireless fidelity (WiFi) system, a cellular system related to the 3rd generation partnership project (3GPP), and another communications system of this type.

Figure 2:
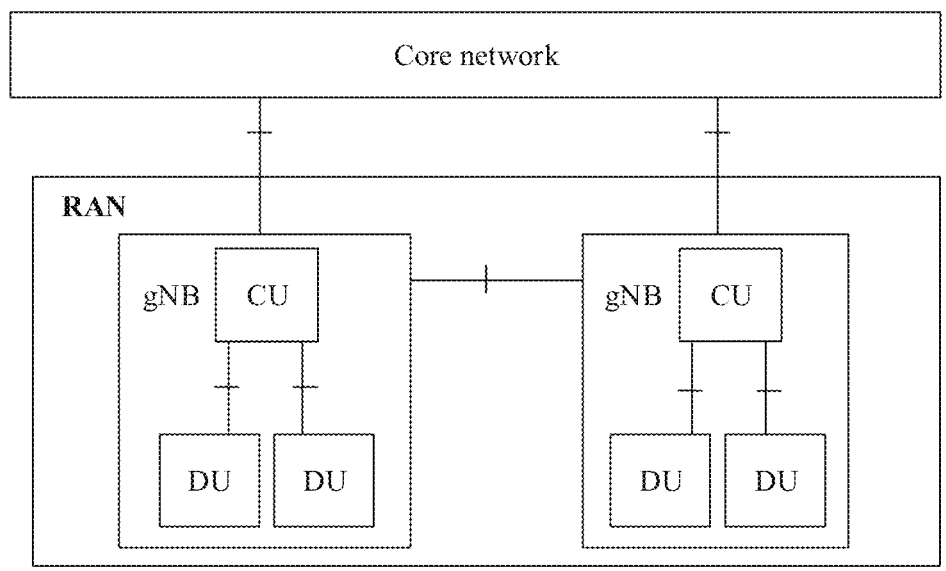
FIG. 2 is a schematic diagram of an example of an architecture of a communications system.

FIG. 2 is a schematic diagram of an example of a possible architecture of a communications system. As shown in FIG. 2, a network device in a radio access network RAN is a base station (such as a gNB) with an architecture in which a centralized unit (CU) and a distributed unit (DU) are separated. The RAN may be connected to a core network (for example, an LTE core network or a 5G core network). A CU and a DU may be understood as division of the base station from a logical function perspective. The CU and the DU may be physically separated or physically deployed together. A plurality of DUs may share one CU. One DU may alternatively be connected to a plurality of CUs (not shown in the figure). The CU and the DU may be connected by using an interface, for example, an F1 interface. The CU and the DU may be obtained through division based on protocol layers of a wireless network. For example, functions of a packet data convergence protocol (PDCP) layer and a radio resource control (RRC) layer are distributed to the CU, but functions of a radio link control (RLC) layer, a media access control (MAC) layer, and a physical layer are distributed to the DU. It may be understood that, division into processing functions of the CU and the DU based on the protocol layers is merely an example, and the processing functions of the CU and the DU may alternatively be divided in another manner. For example, the CU or the DU may be divided to have functions of more protocol layers. For example, the CU or the DU may alternatively be divided to have some processing functions of protocol layers. In a design, some functions of the RLC layer and functions of a protocol layer above the RLC layer are distributed to the CU, and remaining functions of the RLC layer and functions of a protocol layer below the RLC layer are distributed to on the DU. In another design, functions of the CU or the DU may alternatively be divided based on a service type or another system requirement. For example, division is performed based on a latency. Functions whose processing time needs to satisfy a latency requirement are distributed to the DU, and functions that do not need to satisfy the latency requirement are distributed to the CU. A network architecture shown in FIG. 2 may be used for a 5G communications system, and may alternatively share one or more components or resources with an LTE system. In another design, the CU may alternatively have one or more functions of the core network. One or more CUs may be disposed together, or may be disposed separately. For example, the CUs may be disposed on a network side for centralized management. The DU may have a plurality of radio frequency functions, and the radio frequency functions may be remotely set.

The function of the CU may be implemented by one entity, or may be used to further separate a control plane (CP) and a user plane (UP). For example, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

In this application, the network device may be any device having a wireless transceiver function. The network device includes but is not limited to: an evolved NodeB (NodeB or eNB or e-NodeB, evolved NodeB) in LTE, a base station (gNodeB or gNB) or a transceiver point (transmission receiving point/transmission reception point, TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support the aforementioned networks of a same technology, or may support the aforementioned networks of different technologies. The base station may include one or more co-site or non-co-site TRPs. The network device may alternatively be a radio controller, a CU, and/or a DU in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with a terminal device via a relay station. The terminal device may communicate with a plurality of base stations using different technologies. For example, the terminal device may communicate with a base station supporting an LTE network, may communicate with a base station supporting a 5G network, and may further support a dual connection to a base station in an LTE network and a base station in a 5G network.

The terminal is a device having a wireless transceiver function. The terminal may be deployed on land, indoor or outdoor, or may be hand-held, wearable, or vehicle-mounted; may be deployed on a water surface (for example, on a ship); or may be deployed in the air (for example, on an airplane, a balloon, or a satellite). The terminal may be a mobile phone, a tablet computer (Pad), a computer with a wireless transceiver function, a virtual reality (VR) terminal device, an augmented reality (AR) terminal device, a wireless terminal in industrial control, a vehicle-mounted terminal device, a wireless terminal in self driving, a wireless terminal in remote medical, a wireless terminal in a smart grid, a wireless terminal in transportation safety, a wireless terminal in a smart city, a wireless terminal in a smart home, a wearable terminal device, or the like. An application scenario is not limited in the embodiments of this application. The terminal sometimes may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communications device, a UE agent, a UE apparatus, or the like. The terminal may be fixed or movable.

The embodiments of this application are applicable to a multi-hop data sending scenario.

Figure 3A:
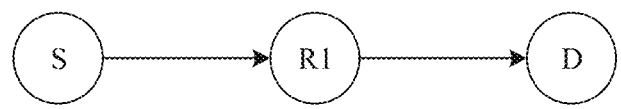
FIG. 3A shows a first possible scenario that is applicable according to an embodiment of this application.

FIG. 3A is used as an example. FIG. 3A shows a possible data sending scenario to which an embodiment of this application is applicable. FIG. 3A schematically shows three nodes: a source node (namely, an S node), a relay node (namely, an R1 node, which may also be referred to as a forwarding node), and a destination node (namely, a D node). The S node expects to send target data to the D node. However, due to some reasons (for example, the S node is excessively far away from the D node, an obstacle exists between the S node and the D node, and a channel condition between the S node and the D node is relatively poor), the S node first sends the target data to the R1 node, and then R1 forwards the target data to the D node. The data sending scenario schematically shown in FIG. 3A may be understood as a two-hop data sending scenario, for example, a first hop is from the S node to the R1 node, and a second hop is from the R1 node to the D node.

Figure 3B:
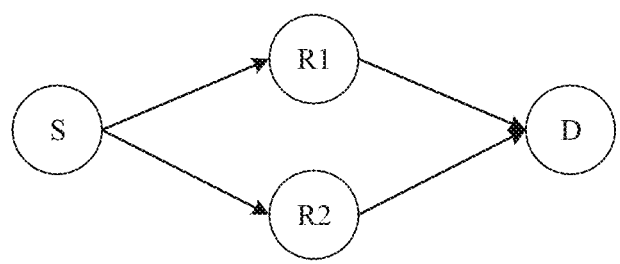
FIG. 3B shows a second possible scenario that is applicable according to an embodiment of this application.

FIG. 3B is used as an example. FIG. 3B shows another possible data sending scenario to which an embodiment of this application is applicable. FIG. 3B schematically shows four nodes: a source node (namely, an S node), two relay nodes (namely, an R1 node and an R2 node, which may also be referred to as two forwarding nodes), and a destination node (namely, a D node). The S node expects to send target data to the D node. However, due to some reasons (for example, the S node is excessively far away from the D node, an obstacle exists between the S node and the D node, and a channel condition between the S node and the D node is relatively poor), the S node first sends the target data to the R1 node and/or the R2 node, and then the R1 node and/or the R2 node forward and/or forwards the target data to the D node. The data sending scenario schematically shown in FIG. 3B may be understood as a two-hop data sending scenario, for example, a first hop is from the S node to the R1 node and/or the R2 node, and a second hop is from the R1 node and/or the R2 node to the D node.

Figure 3C:
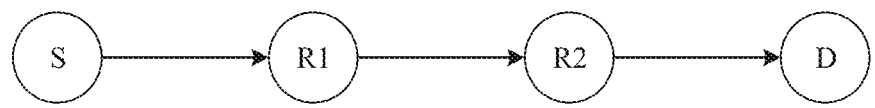
FIG. 3C shows a third possible scenario that is applicable according to an embodiment of this application.

FIG. 3C is used as an example. FIG. 3C shows another possible data sending scenario to which an embodiment of this application is applicable. FIG. 3C schematically shows four nodes: a source node (namely, an S node), two relay nodes (namely, an R1 node and an R2 node, which may also be referred to as two forwarding nodes), and a destination node (namely, a D node). The S node expects to send target data to the D node. However, due to some reasons (for example, the S node is excessively far away from the D node, an obstacle exists between the S node and the D node, and a channel condition between the S node and the D node is relatively poor), the S node first sends the target data to the R1 node, the R1 node forwards the target data to the R2 node, and then the R2 node forwards the target data to the D node. The data sending scenario schematically shown in FIG. 3C may be understood as a three-hop data sending scenario, for example, a first hop is from the S node to the R1 node, and a second hop is from the R1 node to the R2 node, and a third hop is from the R2 node to the D node.

Figure 3D:
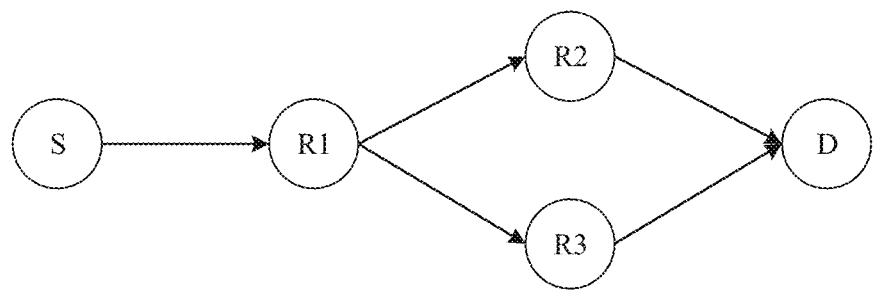
FIG. 3D shows a fourth possible scenario that is applicable according to an embodiment of this application.

FIG. 3D is used as an example. FIG. 3D shows another possible data sending scenario to which an embodiment of this application is applicable. FIG. 3D schematically shows five nodes: a source node (namely, an S node), three relay nodes (namely, an R1 node, an R2 node, and an R3 node, which may also be referred to as three forwarding nodes), and a destination node (namely, a D node). The S node expects to send target data to the D node. However, due to some reasons (for example, the S node is excessively far away from the D node, an obstacle exists between the S node and the D node, and a channel condition between the S node and the D node is relatively poor), the S node first sends the target data to the R1 node, the R1 node forwards the target data to the R2 node and/or the R3 node, and then the R2 node and/or the R3 node forward/forwards the target data to the D node. The data sending scenario schematically shown in FIG. 3D may be understood as a three-hop data sending scenario, for example, a first hop is from the S node to the R1 node, and a second hop is from the R1 node to the R2 node and/or the R3 node, and a third hop is from the R2 node and/or the R3 node to the D node.

It should be noted that FIG. 3A to FIG. 3D are merely used as examples, and a quantity of hops and a quantity of relay nodes in a multi-hop data sending scenario are not limited in the embodiments of this application.

It may be understood that the source node may be a network device or a terminal, the relay node may be a network device or a terminal, and the destination node may be a network device or a terminal.

It may be understood that the embodiments of this application may also be used in a single-hop data sending scenario (e.g., the target data is sent from a source node to a destination node).

The forwarding node in the foregoing multi-hop data sending scenario forwards data to a next receiving node (where the next receiving node may be another forwarding node, or may be a destination node). A manner in which the forwarding node forwards the data includes decoding forwarding (DF). In the DF manner, after receiving data from a previous sending node, a forwarding node demodulates and decodes the data, and then determines, depending on whether the decoding is correct, whether to forward the data. If the decoding is correct, the forwarding node may encode and modulate decoded data again, and send the data to a next receiving node. If the decoding is incorrect, the forwarding node does not forward the data. In the DF manner, when a forwarding node incorrectly decodes data of a previous sending node, the forwarding node cannot forward the data, thereby reducing forwarding performance. Therefore, how to design data sending to improve the forwarding performance becomes an urgent problem to be resolved.

According to the data sending method and the apparatus provided in the embodiments of this application, data generated through soft modulation is sent, so that when a forwarding node incorrectly decodes data of a previous sending node, the forwarding node can still forward the data, thereby improving forwarding performance.

The following describes the technical solutions of this application in detail by using one or more embodiments with reference to the accompanying drawings. The following example embodiments and implementations may be combined with each other, and same or similar concepts or processes may not be described repeatedly in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may also be implemented in a computer processor and a memory coupled to the processor.

FIG. 4 is a schematic flowchart of a data sending method according to an embodiment of this application. It may be understood that data sent according to the data sending method in this embodiment of this application may be data including control information, may be data including service information, or may be data including both control information and service information. As shown in FIG. 4, the method in this embodiment may include the following parts.

Part 400: A node generates a modulation symbol based on first data and/or second data, where the modulation symbol satisfies a mapping relationship with the first data and/or the second data. The first data includes one or more first real numbers, and the first real number is greater than 0 and less than 1. The second data includes one or more second real numbers, and the second real number is greater than $-1$ and less than 1. That a node generates a modulation symbol based on first data and/or second data may also be understood as that the node inputs the first data and/or the second data to generate the modulation symbol.

Part 410: The node preprocesses the modulation symbol to obtain fourth data, where the preprocessing includes one or more of layer mapping, antenna port mapping, precoding, or transform precoding. The foregoing preprocessing may be understood as a processing operation that is to be completed before the modulation symbol is mapped to a physical resource.

Part 420: The node maps the fourth data to the physical resource, and sends the fourth data on the physical resource. The physical resource may include one or more of a time domain resource, a frequency domain resource, a code domain resource, or a space domain resource. For example, the time domain resource included in the physical resource may include at least one frame, at least one subframe, at least one slot, at least one mini-slot, or at least one time domain symbol. For example, the frequency domain resource included in the physical resource may include at least one carrier, at least one component carrier (CC), at least one bandwidth part (BWP), at least one resource block group (RBG), at least one physical resource block group (PRG), at least one resource block (RB), or at least one subcarrier (SC). For example, the space domain resource included in the physical resource may include at least one beam, at least one port, at least one antenna port, or at least one layer/space layer. For example, the code domain resource included in the physical resource may include at least one orthogonal cover code (OCC), or at least one non-orthogonal multiple access (NOMA) code.

The embodiment of this application schematically shown in FIG. 4 may be understood as a method for performing soft modulation and sending a modulation symbol generated through soft modulation. FIG. 5 is a schematic block diagram of performing soft modulation and sending a modulation symbol generated through soft modulation according to an embodiment of this application. In FIG. 5, a soft modulation process is as follows: Soft information is input for modulation and a modulation symbol is output. It may be understood that, in this embodiment of this application, the modulation symbol obtained through soft modulation is also referred to as a soft modulation symbol sometimes. After the soft modulation symbol is obtained through soft modulation, the soft modulation symbol is preprocessed (where a preprocessing process includes one or more layer mapping, antenna port mapping, precoding, or transform precoding) to obtain to-be-sent data, the to-be-sent data is mapped to a physical resource (that is, resource mapping is performed), and the to-be-sent data is sent on the physical resource. The soft information schematically shown in FIG. 5 may be soft information directly obtained by a forwarding node in a process of demodulating or decoding data of a previous sending node, or may be soft information further obtained after soft information directly obtained in a demodulation or decoding process is processed. The soft information directly obtained in the data demodulation process may represent reliability of a modulation bit obtained through demodulation, and the soft information directly obtained in the data decoding process may represent reliability of a system bit and a check bit obtained through decoding.

According to the method provided in this embodiment of this application, even if the forwarding node incorrectly demodulates and/or decodes the data of the previous sending node, the forwarding node may still perform modulation (namely, soft modulation) on the soft information obtained in the demodulation and/or decoding process (where the soft information may be soft information directly obtained in the demodulation and/or decoding process, or may be the soft information further obtained after the soft information directly obtained in the demodulation and/or decoding process is processed), to obtain the soft modulation symbol, and then forward the soft modulation symbol generated through soft modulation, thereby improving forwarding performance.

The first data and/or the second data in part 400 may be understood as the soft information in FIG. 5.

The first data includes one or more first real numbers, and the first real number is greater than 0 and less than 1. The first real number may also be referred to as soft bit information (namely, a possible form of the soft information schematically shown in FIG. 5). A value of common bit information is 0 or 1, but the soft bit information in this embodiment of this application is a real number value between 0 and 1.

The second data includes one or more second real numbers, and the second real number is greater than −1 and less than 1. The second real number may also be referred to as soft symbol information (namely, a possible form of the soft information schematically shown in FIG. 5). A value of common symbol information is −1 or 1, but the soft symbol information in this embodiment of this application is a real number value between −1 and 1.

In part 400, that the modulation symbol satisfies a mapping relationship with the first data and/or the second data may also be understood as that the modulation symbol and the first data and/or the second data satisfy a functional relationship. The mapping relationship may be understood as a mapping relationship implemented by a modulation module in FIG. 5.

In a possible implementation of part 400, the modulation symbol satisfies a mapping relationship with the first data.

For example, the mapping relationship is $\tilde{Q}=1/\sqrt{2}\times[(1-2\tilde{b}_0)+j(1-2\tilde{b}_0)]$, where $\tilde{b}_0$ is a first real number included in the first data, $\tilde{Q}$ is the modulation symbol, and j is an imaginary unit. The mapping relationship may be understood as a mapping relationship that the modulation symbol satisfies with the first data when the modulation module in FIG. 5 uses a binary phase shift keying (BPSK) modulation scheme. The node inputs the first real number $\tilde{b}_0$ based on the mapping relationship, and generates a complex number modulation symbol $\tilde{Q}$. According to the foregoing example method, the soft modulation may be implemented by using the BPSK modulation scheme, thereby reducing implementation complexity of the soft modulation.

For example, the mapping relationship is $\tilde{Q}=1/\sqrt{2}\times[(1-2\tilde{b}_0)+j(1-2\tilde{b}_1)]$, where $\tilde{b}_0$ and $\tilde{b}_1$ are two first real numbers included in the first data, $\tilde{Q}$ is the modulation symbol, and j is an imaginary unit. The mapping relationship may be understood as a mapping relationship that the modulation symbol satisfies with the first data when the modulation module in FIG. 5 uses a quadrature phase shift keying (QPSK) modulation scheme. The node inputs the first real numbers $\tilde{b}_0$ and $\tilde{b}_1$ based on the mapping relationship, and generates a complex number modulation symbol $\tilde{Q}$. It may be understood that $\tilde{b}_0$ may not be equal to $\tilde{b}_1$, or may be equal to $\tilde{b}_1$. A value relationship between the first real numbers $\tilde{b}_0$ and $\tilde{b}_1$ is not limited in this application. According to the foregoing example method, the soft modulation may be implemented by using the QPSK modulation scheme, thereby reducing the implementation complexity of the soft modulation.

For example, the mapping relationship is $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where $\tilde{b}_0$, $\tilde{b}_1$, $\tilde{b}_2$, and $\tilde{b}_3$ are four first real numbers included in the first data, $\tilde{Q}$ is the modulation symbol, and j is an imaginary unit. The mapping relationship may be understood as a mapping relationship that the modulation symbol satisfies with the first data when the modulation module in FIG. 5 uses a 16 quadrature amplitude modulation (16QAM) modulation scheme. The node inputs the first real numbers $\tilde{b}_0$, $\tilde{b}_1$, $\tilde{b}_2$, and $\tilde{b}_3$ based on the mapping relationship, and generates a complex number modulation symbol $\tilde{Q}$. It may be understood that a value relationship between the first real numbers $\tilde{b}_0$, $\tilde{b}_1$, $\tilde{b}_2$, and $\tilde{b}_3$ is not limited in this application. According to the foregoing example method, the soft modulation may be implemented by using the 16QAM modulation scheme, thereby reducing the implementation complexity of the soft modulation.

For example, the mapping relationship is $\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where $\tilde{b}_0$, $\tilde{b}_1$, $\tilde{b}_2$, $\tilde{b}_3$, $\tilde{b}_4$, and $\tilde{b}_5$ are six first real numbers included in the first data, $\tilde{Q}$ is the modulation symbol, and j is an imaginary unit. The mapping relationship may be understood as a mapping relationship that the modulation symbol satisfies with the first data when the modulation module in FIG. 5 uses a 64 quadrature amplitude modulation (64QAM) modulation scheme. The node inputs the first real numbers $\tilde{b}_0$, $\tilde{b}_1$, $\tilde{b}_2$, $\tilde{b}_3$, $\tilde{b}_4$, and $\tilde{b}_5$ based on the mapping relationship, and generates a complex number modulation symbol $\tilde{Q}$. It may be understood that a value relationship between the first real numbers $\tilde{b}_0$, $\tilde{b}_1$, $\tilde{b}_2$, $\tilde{b}_3$, $\tilde{b}_4$, and $\tilde{b}_5$ is not limited in this application. According to the foregoing example method, the soft modulation may be implemented by using the 64QAM modulation scheme, thereby reducing the implementation complexity of the soft modulation.

It may be understood that the mapping relationship in the foregoing implementation may alternatively be a mapping relationship that the modulation symbol satisfies with the first data and that corresponds to another modulation scheme. For example, the another modulation scheme may be 256QAM, 512QAM, 1024QAM, or pi/2-BPSK. This is not limited in this embodiment of this application.

In another possible implementation of part 400, the modulation symbol satisfies a mapping relationship with the second data.

For example, the mapping relationship is $\tilde{Q}=1/\sqrt{2}\times[\tilde{a}_0+j\tilde{a}_0]$, where $\tilde{a}_0$ is a second real number included in the second data, $\tilde{Q}$ is the modulation symbol, and j is an imaginary unit. The mapping relationship may be understood as a mapping relationship that the modulation symbol satisfies with the second data when the modulation module in FIG. 5 uses the BPSK modulation scheme. The node inputs the second real number $\tilde{a}_0$ based on the mapping relationship, and generates a complex number modulation symbol $\tilde{Q}$. According to the foregoing example method, the soft modulation may be implemented by using the BPSK modulation scheme, thereby reducing the implementation complexity of the soft modulation.

For example, the mapping relationship is $\tilde{Q}=1/\sqrt{2}\times[\tilde{a}_0+j\tilde{a}_1]$, where $\tilde{a}_0$ and $\tilde{a}_1$ are two second real numbers included in the second data, $\tilde{Q}$ is the modulation symbol, and j is an imaginary unit. The mapping relationship may be understood as a mapping relationship that the modulation symbol satisfies with the second data when the modulation module in FIG. 5 uses the QPSK modulation scheme. The node inputs the second real numbers $\tilde{a}_0$ and $\tilde{a}_1$ based on the mapping relationship, and generates a complex number modulation symbol $\tilde{Q}$. It may be understood that $\tilde{a}_0$ may not be equal to $\tilde{a}_1$, or may be equal to $\tilde{a}_1$. A value relationship between the second real numbers $\tilde{a}_0$ and $\tilde{a}_1$ is not limited in this application. According to the foregoing example method, the soft modulation may be implemented by using the QPSK modulation scheme, thereby reducing the implementation complexity of the soft modulation.

For example, the mapping relationship is $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where $\tilde{a}_0$, $\tilde{a}_1$, $\tilde{a}_2$, and $\tilde{a}_3$ are four second real numbers included in the second data, $\tilde{Q}$ is the modulation symbol, and j is an imaginary unit. The mapping relationship may be understood as a mapping relationship that the modulation symbol satisfies with the second data when the modulation module in FIG. 5 uses the 16QAM modulation scheme. The node inputs the second real numbers $\tilde{a}_0$, $\tilde{a}_1$, $\tilde{a}_2$, and $\tilde{a}_3$ based on the mapping relationship, and generates a complex number modulation symbol $\tilde{Q}$. It may be understood that a value relationship between the second real numbers $\tilde{a}_0$, $\tilde{a}_1$, $\tilde{a}_2$, and $\tilde{a}_3$ is not limited in this application. According to the foregoing example method, the soft modulation may be implemented by using the 16QAM modulation scheme, thereby reducing the implementation complexity of the soft modulation.

For example, the mapping relationship is $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where $\tilde{a}_0$, $\tilde{a}_1$, $\tilde{a}_2$, $\tilde{a}_3$, $\tilde{a}_4$, and $\tilde{a}_5$ are six second real numbers included in the second data, $\tilde{Q}$ is the modulation symbol, and j is an imaginary unit. The mapping relationship may be understood as a mapping relationship that the modulation symbol satisfies with the second data when the modulation module in FIG. 5 uses the 64QAM modulation scheme. The node inputs the second real numbers $\tilde{a}_0$, $\tilde{a}_1$, $\tilde{a}_2$, $\tilde{a}_3$, $\tilde{a}_4$, and $\tilde{a}_5$ based on the mapping relationship, and generates a complex number modulation symbol $\tilde{Q}$. It may be understood that a value relationship between the second real numbers $\tilde{a}_0$, $\tilde{a}_1$, $\tilde{a}_2$, $\tilde{a}_3$, $\tilde{a}_4$, and $\tilde{a}_5$ is not limited in this application. According to the foregoing example method, the soft modulation may be implemented by using the 64QAM modulation scheme, thereby reducing the implementation complexity of the soft modulation.

It may be understood that the mapping relationship in the foregoing implementation may alternatively be a mapping relationship that the modulation symbol satisfies with the second data and that corresponds to another modulation scheme. For example, the another modulation scheme may be 256QAM, 512QAM, 1024QAM, or pi/2-BPSK. This is not limited in this embodiment of this application.

In a possible implementation of part 400, the modulation symbol satisfies a mapping relationship with the first data and the second data.

For example, the mapping relationship is $\tilde{Q}=1/\sqrt{2}[(1-2\tilde{b}_0)+j\tilde{a}_1]$, where $\tilde{b}_0$ is a first real number included in the first data, $\tilde{a}_1$ is a second real number included in the second data, $\tilde{Q}$ is the modulation symbol, and j is an imaginary unit. The mapping relationship may be understood as a mapping relationship that the modulation symbol satisfies with the first data and the second data when the modulation module in FIG. 5 uses the QPSK modulation scheme. The node inputs the first real number $\tilde{b}_0$ and the second real number $\tilde{a}_0$ based on the mapping relationship, and generates a complex number modulation symbol $\tilde{Q}$. It may be understood that $\tilde{a}_0$ may not be equal to $\tilde{b}_0$, or may be equal to $\tilde{b}_0$. A value relationship between the first real number $\tilde{b}_0$ and the second real number $\tilde{a}_0$ is not limited in this application. According to the foregoing example method, the soft modulation may be implemented by using the QPSK modulation scheme, thereby reducing the implementation complexity of the soft modulation.

For example, the mapping relationship is $\tilde{Q}=1/\sqrt{10}\times\{(1-2\tilde{b}_0)[2-\tilde{a}_2]+j(1-2\tilde{b}_1)[2-\tilde{a}_3]\}$, where $\tilde{b}_0$ and $\tilde{b}_1$ are two first real numbers included in the first data, $\tilde{a}_2$ and $\tilde{a}_3$ are two second real numbers included in the second data, $\tilde{Q}$ is the modulation symbol, and j is an imaginary unit. The mapping relationship may be understood as a mapping relationship that the modulation symbol satisfies with the first data and the second data when the modulation module in FIG. 5 uses the 16QAM modulation scheme. The node inputs the first real numbers $\tilde{b}_0$ and $\tilde{b}_1$ and the second real numbers $\tilde{a}_2$ and $\tilde{a}_3$ based on the mapping relationship, and generates a complex number modulation symbol $\tilde{Q}$. It may be understood that a value relationship between the first real numbers $\tilde{b}_0$ and $\tilde{b}_1$ and the second real numbers $\tilde{a}_2$ and $\tilde{a}_3$ is not limited in this application. According to the foregoing example method, the soft modulation may be implemented by using the 16QAM modulation scheme, thereby reducing the implementation complexity of the soft modulation.

It may be understood that the mapping relationship in the foregoing implementation may alternatively be a mapping relationship that the modulation symbol satisfies with the first data and the second data and that corresponds to another modulation scheme. For example, the another modulation scheme may be BPSK, 64QAM, 256QAM, 512QAM, 1024QAM, or pi/2-BPSK. This is not limited in this embodiment of this application. In addition, it may be understood that specific locations of the first data and the second data in the mapping relationship are not limited in the foregoing implementation. Both the first data and the second data fall within the protection scope of the embodiments of this application, provided that both the first data and the second data exist in the mapping relationship.

In the part 400, the first data may further include one or more third real numbers, and the third real number is equal to 0 or 1. The second data may further include one or more fourth real numbers, and the fourth real number is equal to −1 or 1. In this case, the first data includes one or more of the foregoing first real numbers and one or more of the third foregoing real numbers, and the first data may be considered as soft bit information (namely, a possible form of the soft information schematically shown in FIG. 5). The second data includes one or more of the foregoing second real numbers and one or more of the foregoing fourth real numbers, and the second data may be considered as soft symbol information (namely, a possible form of the soft information schematically shown in FIG. 5).

In another possible implementation of the part 400, the modulation symbol satisfies a mapping relationship with the first data that includes one or more of the foregoing first real numbers and one or more of the foregoing third real numbers.

For example, the mapping relationship is $\tilde{Q}=1/\sqrt{2}\times[(1-2\tilde{b}_0)+j(1-2\tilde{b}_1)]$, where one of $\tilde{b}_0$ and $\tilde{b}_1$ is a first real number included in the first data, the other one is a third real number included in the first data, $\tilde{Q}$ is the modulation symbol, and j is an imaginary unit. For example, $\tilde{b}_0$ is the first real number and $\tilde{b}_1$ is the third real number, or $\tilde{b}_0$ is the third real number and $\tilde{b}_1$ is the first real number. The mapping relationship may be understood as a mapping relationship that the modulation symbol satisfies with the first data when the modulation module in FIG. 5 uses the QPSK modulation scheme. The node inputs the first data $\tilde{b}_0$ and $\tilde{b}_1$ based on the mapping relationship, and generates a complex number modulation symbol $\tilde{Q}$. According to the foregoing example method, the soft modulation may be implemented by using the QPSK modulation scheme, thereby reducing the implementation complexity of the soft modulation.

For example, the mapping relationship is $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where a part of $\tilde{b}_0$, $\tilde{b}_1$, $\tilde{b}_2$, and $\tilde{b}_3$ is a first real number included in the first data, the other part is a third real number included in the first data, $\tilde{Q}$ is the modulation symbol, and j is an imaginary unit. For example, $\tilde{b}_0$ and $\tilde{b}_1$ are the first real numbers and $\tilde{b}_2$ and $\tilde{b}_3$ are the third real numbers, or $\tilde{b}_0$ and $\tilde{b}_1$ are the third real numbers and $\tilde{b}_2$ and $\tilde{b}_3$ are the first real numbers. It may be understood that, in the foregoing four real numbers $\tilde{b}_0$, $\tilde{b}_1$, $\tilde{b}_2$, and $\tilde{b}_3$, specifically which real numbers are first real numbers and which real numbers are third real numbers are not limited in this embodiment of this application. The mapping relationship may be understood as a mapping relationship that the modulation symbol satisfies with the first data when the modulation module in FIG. 5 uses the 16QAM modulation scheme. The node inputs the first data $\tilde{b}_0$, $\tilde{b}_1$, $\tilde{b}_2$, and $\tilde{b}_3$ based on the mapping relationship, and generates a complex number modulation symbol $\tilde{Q}$. According to the foregoing example method, the soft modulation may be implemented by using the 16QAM modulation scheme, thereby reducing the implementation complexity of the soft modulation.

For example, the mapping relationship is $\tilde{Q}=1/\sqrt{42}\times\{(1\times 2\tilde{b}_0)\ [4-(1-2\tilde{b}_2)\ [2-(1-2\tilde{b}_4)]]+j(1-2\tilde{b}_1)\ [4-(1-2\tilde{b}_3)\ [2-(1-2\tilde{b}_5)]]\}$, where a part of $\tilde{b}_0$, $\tilde{b}_1$, $\tilde{b}_2$, $\tilde{b}_3$, $\tilde{b}_4$, and $\tilde{b}_5$ is a first real number included in the first data, the other part is a third real number included in the first data, $\tilde{Q}$ is the modulation symbol, and j is an imaginary unit. For example, $\tilde{b}_0$, $\tilde{b}_1$, and $\tilde{b}_2$ are the first real numbers and $\tilde{b}_3$, $\tilde{b}_4$, and $\tilde{b}_5$ are the third real numbers, or $\tilde{b}_0$, $\tilde{b}_1$, and $\tilde{b}_2$ are the third real numbers and $\tilde{b}_3$, $\tilde{b}_4$, and $\tilde{b}_5$ are the first real numbers. It may be understood that, in the foregoing six real numbers $\tilde{b}_0$, $\tilde{b}_1$, $\tilde{b}_2$, $\tilde{b}_3$, $\tilde{b}_4$, and $\tilde{b}_5$, specifically which real numbers are first real numbers and which real numbers are third real numbers are not limited in this embodiment of this application. The mapping relationship may be understood as a mapping relationship that the modulation symbol satisfies with the first data when the modulation module in FIG. 5 uses the 64QAM modulation scheme. The node inputs the first data $\tilde{b}_0$, $\tilde{b}_1$, $\tilde{b}_2$, $\tilde{b}_3$, $\tilde{b}_4$, and $\tilde{b}_5$ based on the mapping relationship, and generates a complex number modulation symbol $\tilde{Q}$. According to the foregoing example method, the soft modulation may be implemented by using the 64QAM modulation scheme, thereby reducing the implementation complexity of the soft modulation.

It may be understood that the mapping relationship in the foregoing implementation may alternatively be a mapping relationship that the modulation symbol satisfies with the first data and that corresponds to another modulation scheme. For example, the another modulation scheme may be 256QAM, 512QAM, or 1024QAM. This is not limited in this embodiment of this application.

In another possible implementation of the part 400, the modulation symbol satisfies a mapping relationship with the second data that includes one or more of the foregoing second real numbers and one or more of the foregoing fourth real numbers.

For example, the mapping relationship is $\tilde{Q}=1/\sqrt{2}\times[\tilde{a}_0+j\tilde{a}_1]$, where one of $\tilde{a}_0$ and $\tilde{a}_1$ is a second real number included in the second data, the other one is a fourth real number included in the second data, $\tilde{Q}$ is the modulation symbol, and j is an imaginary unit. For example, $\tilde{a}_0$ is the second real number and $\tilde{a}_1$ is the fourth real number, or $\tilde{a}_0$ is the fourth real number and $\tilde{a}_1$ is the second real number. The mapping relationship may be understood as a mapping relationship that the modulation symbol satisfies with the second data when the modulation module in FIG. 5 uses the QPSK modulation scheme. The node inputs the second data $\tilde{a}_0$ and $\tilde{a}_1$ based on the mapping relationship, and generates a complex number modulation symbol $\tilde{Q}$. According to the foregoing example method, the soft modulation may be implemented by using the QPSK modulation scheme, thereby reducing the implementation complexity of the soft modulation.

For example, the mapping relationship is $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where a part of $\tilde{a}_0$, $\tilde{a}_1$, $\tilde{a}_2$, and $\tilde{a}_3$ is a second real number included in the second data, the other part is a fourth real number included in the second data, $\tilde{Q}$ is the modulation symbol, and j is an imaginary unit. For example, $\tilde{a}_0$ and $\tilde{a}_1$ are the second real numbers and $\tilde{a}_2$ and $\tilde{a}_3$ are the fourth real numbers, or $\tilde{a}_0$ and $\tilde{a}_1$ are the fourth real numbers and $\tilde{a}_2$ and $\tilde{a}_3$ are the second real numbers. It may be understood that, in the foregoing four real numbers $\tilde{a}_0$, $\tilde{a}_1$, $\tilde{a}_2$, and $\tilde{a}_3$, specifically which real numbers are second real numbers and which real numbers are fourth real numbers are not limited in this embodiment of this application. The mapping relationship may be understood as a mapping relationship that the modulation symbol satisfies with the second data when the modulation module in FIG. 5 uses the 16QAM modulation scheme. The node inputs the second data $\tilde{a}_0$, $\tilde{a}_1$, $\tilde{a}_2$, and $\tilde{a}_3$ based on the mapping relationship, and generates a complex number modulation symbol $\tilde{Q}$. According to the foregoing example method, the soft modulation may be implemented by using the 16QAM modulation scheme, thereby reducing the implementation complexity of the soft modulation.

For example, the mapping relationship is $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where a part of $\tilde{a}_0$, $\tilde{a}_1$, $\tilde{a}_2$, $\tilde{a}_3$, $\tilde{a}_4$, and $\tilde{a}_5$ is a second real number included in the second data, the other part is a fourth real number included in the second data, $\tilde{Q}$ is the modulation symbol, and j is an imaginary unit. For example, $\tilde{a}_0$, $\tilde{a}_1$, and $\tilde{a}_2$ are the second real numbers and $\tilde{a}_3$, $\tilde{a}_4$, and $\tilde{a}_5$ are the fourth real numbers, or $\tilde{a}_0$, $\tilde{a}_1$, and $\tilde{a}_2$ are the fourth real numbers and $\tilde{a}_3$, $\tilde{a}_4$, and $\tilde{a}_5$ are the second real numbers. It may be understood that, in the foregoing six real numbers $\tilde{a}_0$, $\tilde{a}_1$, $\tilde{a}_2$, $\tilde{a}_3$, $\tilde{a}_4$, and $\tilde{a}_5$, specifically which real numbers are second real numbers and which real numbers are fourth real numbers are not limited in this embodiment of this application. The mapping relationship may be understood as a mapping relationship that the modulation symbol satisfies with the second data when the modulation module in FIG. 5 uses the 64QAM modulation scheme. The node inputs the second data $\tilde{a}_0$, $\tilde{a}_1$, $\tilde{a}_2$ $\tilde{a}_3$ $a_4$ and $\tilde{a}_5$ based on the mapping relationship, and generates a complex number modulation symbol $\tilde{Q}$. According to the foregoing example method, the soft modulation may be implemented by using the 64QAM modulation scheme, thereby reducing the implementation complexity of the soft modulation.

It may be understood that the mapping relationship in the foregoing implementation may alternatively be a mapping relationship that the modulation symbol satisfies with the second data and that corresponds to another modulation scheme. For example, the another modulation scheme may be 256QAM, 512QAM, or 1024QAM. This is not limited in this embodiment of this application.

Content described in part 400 in the embodiment of this application schematically shown in FIG. 4 may be alternatively replaced with one of the following 400a to 400e:

400a: Anode generates a modulation symbol based on first data and second data, where the modulation symbol satisfies a mapping relationship with the first data and the second data, the first data includes one or more first real numbers, the first real number is greater than 0 and less than 1, the second data includes one or more fourth real numbers, and the fourth real number is equal to −1 or 1.

400b: Anode generates a modulation symbol based on first data and second data, where the modulation symbol satisfies a mapping relationship with the first data and the second data, the first data includes one or more third real numbers, the third real number is equal to 0 or 1, the second data includes one or more second real numbers, and the second real number is greater than −1 and less than 1.

400c: A node generates a modulation symbol based on first data and second data, where the modulation symbol satisfies a mapping relationship with the first data and the second data, the first data includes one or more first real numbers, the first real number is greater than 0 and less than 1, the second data includes one or more second real numbers and one or more fourth real numbers, the second real number is greater than −1 and less than 1, and the fourth real number is equal to −1 or 1.

400d: A node generates a modulation symbol based on first data and second data, where the modulation symbol satisfies a mapping relationship with the first data and the second data, the first data includes one or more first real numbers and one or more third real numbers, the first real number is greater than 0 and less than 1, the third real number is equal to 0 or 1, the second data includes one or more second real numbers, and the second real number is greater than −1 and less than 1.

400e: A node generates a modulation symbol based on first data and second data, where the modulation symbol satisfies a mapping relationship with the first data and the second data, the first data includes one or more first real numbers and one or more third real numbers, the first real number is greater than 0 and less than 1, the third real number is equal to 0 or 1, the second data includes one or more second real numbers and one or more fourth real numbers, the second real number is greater than −1 and less than 1, and the fourth real number is equal to −1 or 1.

The mapping relationship in the foregoing 400a to 400e may be understood as a mapping relationship implemented by the modulation module in FIG. 5. For descriptions of the mapping relationship, refer to the descriptions of the mapping relationship in the foregoing part 400. Details are not described herein again.

Optionally, in part 400, the node may obtain the first data and/or the second data based on third data. The third data may be understood as original soft information obtained by the node by demodulating or decoding data of a previous sending node. The third data includes one or more fifth real numbers, and a value range of the fifth real number is from A to B. It may be understood that a range from A to B is generally greater than a range from 0 to 1 or a range from −1 to 1. For example, A indicates negative infinity and B indicates positive infinity, or A indicates −30 and B indicates 30. The values of A and B are not limited in this embodiment of this application.

In a possible implementation in which the node obtains the first data based on the third data in part 400, the third data and the first data satisfy $\tilde{b}_i = e^L/(1+e^L)$, where L is the third data (which may also be understood as a fifth real number included in the third data), $\tilde{b}_1$ is the first data (which may also be understood as a first real number or a third real number included in the first data), and $\tilde{b}_1$ is a real number greater than or equal to 0 and less than or equal to 1. In this implementation, original soft information (for example, a value range from negative infinity to positive infinity) that is obtained by the forwarding node and that has a large value range may be compressed to be within a range from 0 to 1, so that complexity of a subsequent operation (for example, modulation) can be reduced.

In another possible implementation in which the node obtains the first data based on the third data in part 400, the node quantizes the third data to obtain the first data. For example, the third data may be quantized by using the table schematically shown in Table 1, to obtain the first data. The left column in Table 1 schematically shows several value intervals of the third data L (which may also be understood as a fifth real number included in the third data), where A and B respectively represent a lower limit value and an upper limit value of L, $c_k$ represents a positive real number, $-c_k$ represents a negative real number, k is an integer greater than or equal to 0 and less than or equal to N, [a, b] represents that the value interval is greater than or equal to a and less than or equal to b, and [a, b) represents that a value interval is greater than or equal to a and less than b. The right column in Table 1 schematically shows several values of the first data $\tilde{b}_1$ (which may also be understood as a first real number or a third real number included in the first data), where $d_l$ represents a real number greater than or equal to 0 and less than or equal to 1, and l is an integer greater than or equal to 0 and less than or equal to 2N. The node obtains the third data L, determines a value interval, in the left column of Table 1, within which a value of the third data L falls, and determines that a value, in the right column of Table 1, corresponding to the value interval is a value, of the first data $\tilde{b}_l$, obtained after the third data L is quantized. It may be understood that Table 1 schematically shows only a possible representation form of a correspondence between the third data L and the first data $\tilde{b}_1$. A specific representation form of the correspondence between the third data L and the first data $\tilde{b}_1$ is not limited in this embodiment of this application, and another possible representation form of the correspondence also falls within the protection scope of the embodiments of this application. In addition, it may be understood that the value intervals of the third data L schematically shown in Table 1 may be obtained by evenly dividing an interval [A, B], or may be obtained by unevenly dividing the interval [A, B]. This is not limited in this embodiment of this application. In this implementation, original soft information (for example, a value range from negative infinity to positive infinity) that is obtained by the forwarding node and that has a large value range may be compressed to be within a range from 0 to 1 in a simple manner of quantization, so that the forwarding node does not need to perform a complex operation, and complexity of a subsequent operation (for example, modulation) can be reduced.

TABLE 1

| Value interval of the third data L (which may also be understood as a fifth real number included in the third data) | Value of the first data $\tilde{b}_i$ (which may also be understood as a first real number or a third real number included in the first data) |
| --- | --- |
| $[c_N, B]$ | $d_{2N}$ |
| $[c_{N-1}, c_N)$ | $d_{2N-1}$ |
| ... | ... |
| $[-c_N, -c_{N-1})$ | $d_1$ |
| $[A, -c_N)$ | $d_0$ |

In a possible implementation in which the node obtains the second data based on the third data in part 400, the third data and the second data satisfy $\tilde{a}_i = \tan h(L/2)$, where L is the third data (which may also be understood as a fifth real number included in the third data), $\tilde{a}_i$ is the second data (which may also be understood as a second real number or a fourth real number included in the second data), and $\tilde{a}_i$ is a real number greater than or equal to −1 and less than or equal to 1. In this implementation, original soft information (for example, a value range from negative infinity to positive infinity) that is obtained by the forwarding node and that has a large value range may be compressed to be within a range from −1 to 1, so that complexity of a subsequent operation (for example, modulation) can be reduced.

In another possible implementation in which the node obtains the second data based on the third data in part 400, the node quantizes the third data to obtain the second data. For example, the third data may be quantized by using the table schematically shown in Table 2, to obtain the second data. The left column in Table 2 schematically shows several value intervals of the third data L (which may also be understood as a fifth real number included in the third data), where A' and B' respectively represent a lower limit value and an upper limit value of L, $c'_k$ represents a positive real number, $-c'_k$ represents a negative real number, k is an integer greater than 0 and less than or equal to N, [a', b'] represents that the value interval is greater than or equal to a' and less than or equal to b', and [a', b') represents that a value interval is greater than or equal to a' and less than b'. The right column in Table 2 schematically shows several values of the second data $\tilde{a}_i$ (which may also be understood as a second real number or a fourth real number included in the second data), where $d_l$ represents a real number greater than or equal to 0 and less than or equal to 1, $-d_l$ represents a real number greater than or equal to −1 and less than or equal to 0, and l is an integer greater than or equal to 0 and less than or equal to N'. The node obtains the third data L, determines a value interval, in the left column of Table 2, within which a value of the third data L falls, and determines that a value, in the right column of Table 2, corresponding to the value interval is a value, of the second data $\tilde{a}_i$, obtained after the third data L is quantized. It may be understood that Table 2 schematically shows only a possible representation form of a correspondence between the third data L and the second data $\tilde{a}_i$. A specific representation form of the correspondence between the third data L and the second data $\tilde{a}_i$ is not limited in this embodiment of this application, and another possible representation form of the correspondence also falls within the protection scope of the embodiments of this application. In addition, it may be understood that the value intervals of the third data L schematically shown in Table 2 may be obtained by evenly dividing an interval [A', B'], or may be obtained by unevenly dividing the interval [A', B']. This is not limited in this embodiment of this application. In this implementation, original soft information (for example, a value range from negative infinity to positive infinity) that is obtained by the forwarding node and that has a large value range may be compressed to be within a range from −1 to 1 in a simple manner of quantization, so that the forwarding node does not need to perform a complex operation, and complexity of a subsequent operation (for example, modulation) can be reduced.

TABLE 2

| Value interval of the third data L (which may also be understood as a fifth real number included in the third data) | Value of the second data $\tilde{a}_i$ (which may also be understood as a second real number or a fourth real number included in the second data) |
|---|---|
| [$c'_{N'}$, B'] | $d'_{N'}$ |
| [$c'_{N'-1}$, $c'_{N'}$) | $d'_{N'-1}$ |
| ... | ... |
| [$c'_1$, $c'_2$) | $d'_1$ |
| [$-c'_1$, $c'_1$) | $d'_0$ |
| [$-c'_2$, $-c'_1$) | $-d'_1$ |
| ... | ... |
| [$-c'_{N'}$, $-c'_{N'-1}$) | $-d'_{N'-1}$ |
| [A', $-c'_{N'}$) | $-d'_{N'}$ |

In a possible implementation in which the node obtains the first data and the second data based on the third data in part 400, the third data and the first data satisfy $\bar{b}_i = e^L/(1+e^L)$, and the third data and the second data satisfy $\tilde{a}_i = \tanh(L/2)$, where L is the third data (which may also be understood as a fifth real number included in the third data), $\bar{b}_i$ is the first data (which may also be understood as a first real number or a third real number included in the first data), $\bar{b}_i$ is a real number greater than or equal to 0 and less than or equal to 1, $\tilde{a}_i$ is the second data (which may also be understood as a second real number or a fourth real number included in the second data), and $\tilde{a}_i$ is a real number greater than or equal to −1 and less than or equal to 1. In this implementation, original soft information (for example, a value range from negative infinity to positive infinity) that is obtained by the forwarding node and that has a large value range may be compressed to be within a range from 0 to 1 and a range from −1 to 1, so that complexity of a subsequent operation (for example, modulation) can be reduced.

In another possible implementation in which the node obtains the first data and the second data based on the third data in part 400, the node quantizes the third data to obtain the first data and the second data. For example, the tables schematically shown in Table 1 and Table 2 may be used to quantize the third data to obtain the first data and the second data. For an example quantization process, refer to the foregoing descriptions of Table 1 and Table 2. Details are not described herein again. In this implementation, original soft information (for example, a value range from negative infinity to positive infinity) that is obtained by the forwarding node and that has a large value range may be compressed to be within a range from 0 to 1 and a range from −1 to 1 in a simple manner of quantization, so that the forwarding node does not need to perform a complex operation, and complexity of a subsequent operation (for example, modulation) can be reduced.

In another possible implementation in which the node obtains the first data and the second data based on the third data in part 400, the node quantizes the third data to obtain the first data, and the third data and the second data satisfy $\tilde{a}_i = \tanh(L/2)$, where L is the third data (which may also be understood as a fifth real number included in the third data), $\tilde{a}_i$ is the second data (which may also be understood as a second real number or a fourth real number included in the second data), and $\tilde{a}_i$ is a real number greater than or equal to −1 and less than or equal to 1. For example, the table schematically shown in Table 1 may be used to quantize the third data to obtain the first data. For an example quantization process, refer to the foregoing descriptions of Table 1. Details are not described herein again. In this implementation, original soft information (for example, a value range from negative infinity to positive infinity) that is obtained by the forwarding node and that has a large value range may be compressed to be within a range from 0 to 1 and a range from −1 to 1, so that the forwarding node does not need to perform a complex operation, and complexity of a subsequent operation (for example, modulation) can be reduced.

In another possible implementation in which the node obtains the first data and the second data based on the third data in part 400, the node quantizes the third data to obtain the second data, and the third data and the first data satisfy $\bar{b}_i = e^L/(1+e^L)$, where L is the third data (which may also be understood as a fifth real number included in the third data), $\bar{b}_i$ is the first data (which may also be understood as a first real number or a third real number included in the first data), and $\bar{b}_i$ is a real number greater than or equal to 0 and less than or equal to 1. For example, the table schematically shown in Table 2 may be used to quantize the third data to obtain the second data. For an example quantization process, refer to the foregoing descriptions of Table 2. Details are not described herein again. In this implementation, original soft information (for example, a value range from negative infinity to positive infinity) that is obtained by the forwarding node and that has a large value range may be compressed to be within a range from 0 to 1 and a range from −1 to 1, so that the forwarding node does not need to perform a complex operation, and complexity of a subsequent operation (for example, modulation) can be reduced.

Optionally, the node may enable or disable the foregoing soft modulation operation.

In a possible implementation of enabling or disabling the soft modulation, the node receives control information, and determines, based on the control information, to generate the modulation symbol based on the first data and/or the second data. The control information may be understood as having a function of controlling the enabling or disabling of the foregoing soft modulation. If the control information indicates a node to use the soft modulation, the node modulates the first data and/or the second data according to the foregoing soft modulation method in this embodiment of this application, to generate the modulation symbol (which may be understood as a soft modulation symbol). If the control information indicates a node not to use soft modulation or indicates a node to use conventional hard modulation, the node modulates a common bit (which may be understood as a hard bit, namely, 0 or 1) and/or a common symbol (which may be understood as a hard symbol, namely, −1 or 1), to generate a common modulation symbol (which may be understood as a hard modulation symbol). In the implementation, when hard modulation and soft modulation coexist, the node can be notified to use a proper modulation scheme, thereby improving robustness of data sending.

The control information may be included in a physical layer message/information or a higher layer message/information. For example, the control information may be included in a physical layer message/information. The physical layer message/information may be, for example, downlink control information (DCI) from a network device, or may be, for example, sidelink control information (SCI) or uplink control information (UCI) from a terminal. The DCI is information sent by the network device and received by the terminal, the SCI is information sent by the terminal and received by another terminal, and the UCI is information sent by the terminal and received by the network device. For another example, the control information may be included in a higher layer message/information, and the higher layer message/information may be, for example, a media access control (MAC) layer message or a radio resource control (RRC) layer message from the network device or the terminal.

In a possible implementation in which the node receives control information and determines, based on the control information, to generate the modulation symbol based on the first data and/or the second data, the node performs soft modulation or hard modulation based on a status indicated by the control information. FIG. 6 is a flowchart of the implementation. In part 600, a node receives control information. If the control information indicates a first status, the node performs hard modulation (performs part 610, for example, the node modulates a common bit and/or a common symbol to generate a common modulation symbol). If the control information indicates a second status, the node performs soft modulation (performs part 620, for example, the node modulates the foregoing first data and/or second data to generate a soft modulation symbol).

In a possible implementation method of the implementation schematically shown in FIG. 6, the control information includes modulation scheme indication information, and the modulation scheme indication information indicates the first status or the second status.

In a possible implementation of the modulation scheme indication information, the modulation scheme indication information includes at least one bit, the first status is indicated when a value of the at least one bit is a first value, the second status is indicated when a value of the at least one bit is a second value, and the first value is different from the second value. For example, the modulation scheme indication information includes one bit, a value "0" of the bit indicates the first status, and a value "1" of the bit indicates the second status. Alternatively, a value "1" of the bit indicates the first status, and a value "0" of the bit indicates the second status. It may be understood that the implementation of the modulation scheme indication information may be considered as that the modulation scheme indication information explicitly indicates the first status or the second status.

In a possible implementation of carrying the modulation scheme indication information, the control information includes a newly added data field (where for example, the data field may be referred to as a modulation scheme indication field) used to carry the modulation scheme indication information, and the node may obtain the modulation scheme indication information by parsing bit data carried in the data field.

In another possible implementation of carrying the modulation scheme indication information, an existing data field in the control information is reused to carry the modulation scheme indication information. The existing data field is reused to carry the modulation scheme indication information, so that no bit of the control information needs to be newly added, thereby reducing indication overheads.

For example, one or more bits in a modulation and coding scheme (MCS) indication field in the DCI or the SCI may be reused to carry the modulation scheme indication information. Alternatively, one or more bits in a BWP indication field in the DCI or the SCI may be reused to carry the modulation scheme indication information. Alternatively, one or more bits in a reserved field in the DCI or the SCI may be reused to carry the modulation scheme indication information. Alternatively, one or more bits in an MCS indication field in the DCI or the SCI and one or more bits in a BWP indication field in the DCI or the SCI may be reused to carry the modulation scheme indication information. Alternatively, one or more bits in an MCS indication field in the DCI or the SCI and one or more bits in a reserved field in the DCI or the SCI may be reused to carry the modulation scheme indication information. Alternatively, one or more bits in a BWP indication field in the DCI or the SCI and one or more bits in a reserved field in the DCI or the SCI may be reused to carry the modulation scheme indication information. Alternatively, one or more bits in an MCS indication field in the DCI or the SCI, one or more bits in a BWP indication field in the DCI or the SCI, and one or more bits in a reserved field in the DCI or the SCI may be reused to carry the modulation scheme indication information. For another example, one or more bits in an acknowledgment indication field (for example, a data field carrying an acknowledgment (ACK)/a negative acknowledgment (NACK)) in the DCI, the UCI, or the SCI may be reused to carry the modulation scheme indication information.

In another possible implementation of the modulation scheme indication information, the modulation scheme indication information includes a bit sequence, the bit sequence is used to scramble the control information, the first status is indicated when the bit sequence is a first bit sequence, the second status is indicated when the bit sequence is a second bit sequence, and the first bit sequence is different from the second bit sequence. That the first bit sequence is different from the second bit sequence may also be understood as that an initial value of the first bit sequence is different from an initial value of the second bit sequence, or that a parameter of an initial value of the first bit sequence is different from a parameter of an initial value of the second bit sequence. It may be understood that the implementation of the modulation scheme indication information may be considered as that the modulation scheme indication information implicitly indicates the first status or the second status. In the implementation, the modulation scheme indication information is implicitly included in the scrambling sequence of the control information, so that no bit of the control information needs to be newly added, thereby reducing indication overheads.

In still another possible implementation of the modulation scheme indication information, the modulation scheme indication information includes a physical resource, the control information is mapped to the physical resource, the first status is indicated when the physical resource is a first physical resource, the second status is indicated when the physical resource is a second physical resource, and the first physical resource is different from the second physical resource. It may be understood that the implementation of the modulation scheme indication information may be considered as that the modulation scheme indication information implicitly indicates the first status or the second status. In the implementation, the modulation scheme indication information is implicitly included in the physical resource that carries the control information, so that no bit of the control information needs to be newly added, thereby reducing indication overheads.

In another possible implementation method of the implementation schematically shown in FIG. 6, the control information includes the modulation scheme indication information and identification information that is of the node, the identification information of the node indicates the node, and the modulation scheme indication information indicates the first status or the second status. For descriptions of indicating the first status or the second status by the modulation scheme indication information, refer to the descriptions in the previous possible implementation method of the implementation schematically shown in FIG. 6. Details are not described herein again. The identification information of the node indicates the node. The node receives the control information, and parses out the identification information of the node from the control information, to learn that the control information is sent to the node. It may be understood that the identification information of the node may also indicate a group of nodes, the group of nodes includes a plurality of nodes, and any one or more of the plurality of nodes receive the control information and parse out the identification information of the node from the control information, to learn that the control information is sent to the one or more nodes.

In a possible implementation of the identification information of the node, the identification information includes at least one bit, and the node may obtain the identification information of the node by parsing a value of the at least one bit. The identification information of the node may be an identifier or an index of the node, and the identifier or the index is used to indicate the node. The identification information of the node may alternatively be one or more bits in some bits in a bitmap, and the node is indicated by using the one or more bits in the bits. It may be understood that the implementation may be considered as that the identification information of the node explicitly indicates the node.

In a possible implementation of carrying the identification information of the node, the control information includes a newly added data field (where for example, the data field may be referred to as a node indication field) used to carry the identification information of the node, and the node may obtain the identification information of the node by parsing bit data carried in the data field.

In another possible implementation of carrying the identification information of the node, an existing data field in the control information is reused to carry the identification information of the node. The existing data field is reused to carry the identification information of the node, so that no bit of the control information needs to be newly added, thereby reducing indication overheads.

For example, one or more bits in an MCS indication field in the DCI or the SCI may be reused to carry the identification information of the node. Alternatively, one or more bits in a BWP indication field in the DCI or the SCI may be reused to carry the identification information of the node. Alternatively, one or more bits in a reserved field in the DCI or the SCI may be reused to carry the identification information of the node. Alternatively, one or more bits in an MCS indication field in the DCI or the SCI and one or more bits in a BWP indication field in the DCI or the SCI may be reused to carry the identification information of the node. Alternatively, one or more bits in an MCS indication field in the DCI or the SCI and one or more bits in a reserved field in the DCI or the SCI may be reused to carry the identification information of the node. Alternatively, one or more bits in a BWP indication field in the DCI or the SCI and one or more bits in a reserved field in the DCI or the SCI may be reused to carry the identification information of the node. Alternatively, one or more bits in an MCS indication field in the DCI or the SCI, one or more bits in a BWP indication field in the DCI or the SCI, and one or more bits in a reserved field in the DCI or the SCI may be reused to carry the identification information of the node. For another example, one or more bits in an acknowledgment indication field (for example, a data field carrying an ACK/a NACK) in the DCI, the UCI, or the SCI may be reused to carry the identification information of the node.

In another possible implementation of the identification information of the node, the identification information of the node includes a bit sequence, the bit sequence is used to scramble the control information, and the node may obtain the identification information of the node by parsing the bit sequence. It may be understood that the implementation may be considered as that the identification information of the node implicitly indicates the node. In the implementation, the identification information of the node is implicitly included in the scrambling sequence of the control information, so that no bit of the control information needs to be newly added, thereby reducing indication overheads.

In still another possible implementation of the identification information of the node, the identification information of the node includes a physical resource, the control information is mapped to the physical resource, and the node may obtain the identification information of the node by receiving the control information on the physical resource. It may be understood that the implementation may be considered as that the identification information of the node implicitly indicates the node. In the implementation, the identification information of the node is implicitly included in the physical resource that carries the control information, so that no bit of the control information needs to be newly added, thereby reducing indication overheads.

Figure 7:
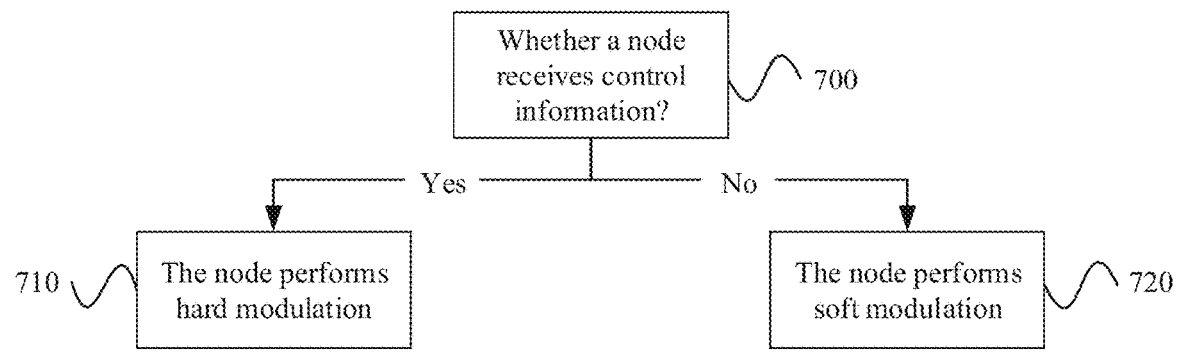
FIG. 7 is another flowchart of indicating, by using control information, a node to perform soft modulation according to an embodiment of this application.

In another possible implementation in which the node receives control information and determines, based on the control information, to generate the modulation symbol based on the first data and/or the second data, the node determines, depending on whether the control information is received, to perform soft modulation or hard modulation. FIG. 7 is a flowchart of the implementation. In part 700, a node determines whether control information is received. If the node does not receive the control information, the node performs hard modulation (performs part 710, for example, the node modulates a common bit and/or a common symbol to generate a common modulation symbol). If the node receives the control information, the node performs soft modulation (performs part 720, for example, the node modulates the foregoing first data and/or second data to generate a soft modulation symbol). It may be understood that locations of part 710 and part 720 in FIG. 7 may alternatively be interchanged, for example, the node may perform soft modulation (perform part 720, for example, the node modulates the foregoing first data and/or second data to generate a soft modulation symbol) when the control information is not received, or perform hard modulation (perform part 710, for example, the node modulates a common bit and/or a common symbol to generate a common modulation symbol) when the control information is received.

In a possible implementation method of the implementation schematically shown in FIG. 7, the control information includes identification information of the node, and the identification information of the node indicates the node. In another possible implementation method of the implementation schematically shown in FIG. 7, the control information includes modulation scheme indication information, and the modulation scheme indication information indicates the node to perform soft modulation (where it may be understood that the modulation scheme indication information may alternatively indicate the node to perform hard modulation). In still another possible implementation method of the implementation schematically shown in FIG. 7, the control information includes modulation scheme indication information and identification information that is of the node, the identification information of the node indicates the node, and the modulation scheme indication information indicates the node to perform soft modulation (where it may be understood that the modulation scheme indication information may alternatively indicate the node to perform hard modulation). For an example implementation of the modulation scheme indication information, refer to the descriptions of the modulation scheme indication information in the implementation schematically shown in FIG. 6. For an example implementation of the identification information of the node, refer to the descriptions of the identification information of the node in the implementation schematically shown in FIG. 6. Details are not described herein again.

In a possible implementation of a sender of the control information in FIG. 6 or FIG. 7, the sender of the control information is an upper-level node of the node. The upper-level node of the node may be understood as a previous-hop node or a previous-several-hop node of the node.

Figure 8A:
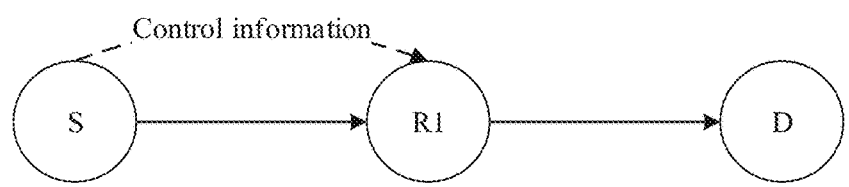
FIG. 8A is a first schematic diagram of receiving and sending control information according to an embodiment of this application.

For example, FIG. 8A shows an example in which the sender of the control information is an upper-level node of the node. In FIG. 8A, an R1 node is a node that receives the control information, an S node is a node that sends the control information, and the S node is a previous-hop node of the R1 node.

Figure 8B:
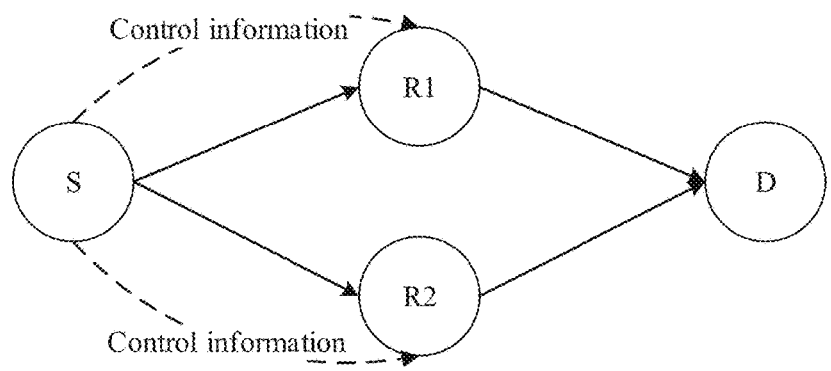
FIG. 8B is a second schematic diagram of receiving and sending control information according to an embodiment of this application.

For example, FIG. 8B shows another example in which the sender of the control information is an upper-level node of the node. In FIG. 8B, an R1 node and an R2 node are nodes that receive the control information, an S node is a node that sends the control information, and the S node is a previous-hop node of the R1 node and the R2 node.

Figure 8C:
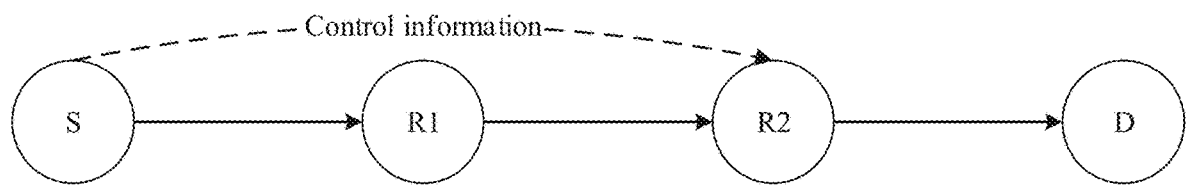
FIG. 8C is a third schematic diagram of receiving and sending control information according to an embodiment of this application.

For example, FIG. 8C shows another example in which the sender of the control information is an upper-level node of the node. In FIG. 8C, an R2 node is a node that receives the control information, an S node is a node that sends the control information, and the S node is a previous-two-hop node of the R2 node.

Figure 8D:
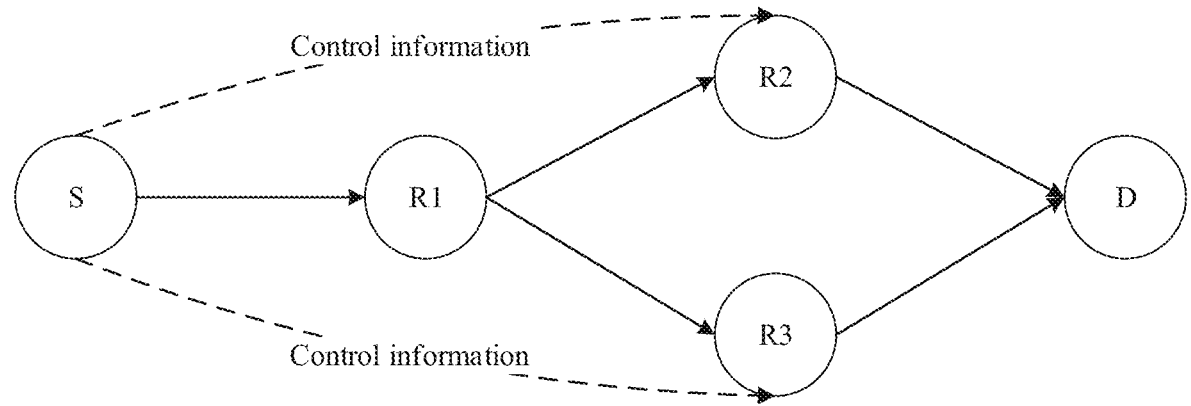
FIG. 8D is a fourth schematic diagram of receiving and sending control information according to an embodiment of this application.

For example, FIG. 8D shows another example in which the sender of the control information is an upper-level node of the node. In FIG. 8D, an R2 node and an R3 node are nodes that receive the control information, an S node is a node that sends the control information, and the S node is a previous-two-hop node of the R2 node and the R3 node.

Figure 8E:
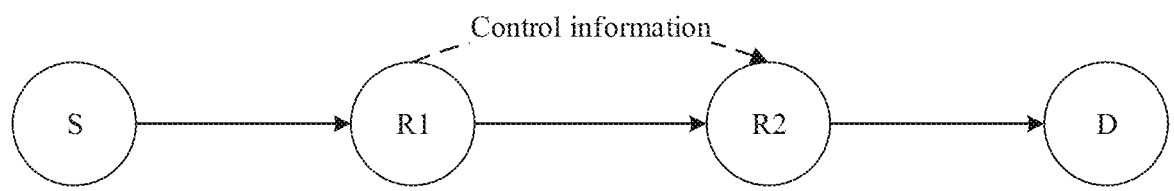
FIG. 8E is a fifth schematic diagram of receiving and sending control information according to an embodiment of this application.

For example, FIG. 8E shows another example in which the sender of the control information is an upper-level node of the node. In FIG. 8E, an R2 node is a node that receives the control information, an R1 node is a node that sends the control information, and the R1 node is a previous-hop node of the R2 node.

Figure 8F:
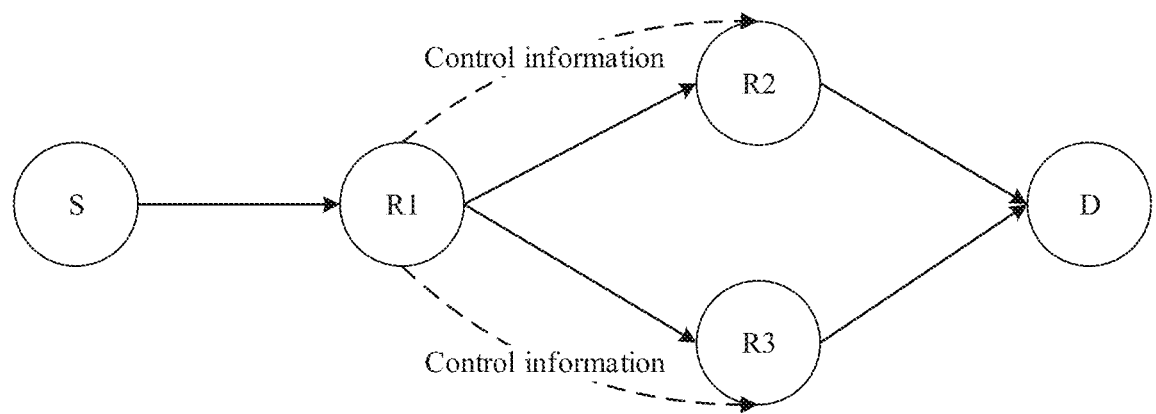
FIG. 8F is a sixth schematic diagram of receiving and sending control information according to an embodiment of this application.

For example, FIG. 8F shows another example in which the sender of the control information is an upper-level node of the node. In FIG. 8F, an R2 node and an R3 node are nodes that receive the control information, an R1 node is a node that sends the control information, and the R1 node is a previous-hop node of the R2 node and the R3 node.

In the implementation of sending the control information, the upper-level node of the node may send, in any one of the following cases to the node, the control information used to indicate the node to enable soft modulation:

Case 1-1: The upper-level node of the node receives control information, for enabling the soft modulation, sent by another node. In the manner, the node can forward the control information for enabling the soft modulation, so that effective coverage of the control information is ensured.

Case 1-2: The upper-level node of the node fails to demodulate or decode data from an upper-level node of the upper-level node. Usually, when an upper-level node fails to demodulate or decode data, a lower-level node of the upper-level node also fails to decode the data. In the manner, after an upper-level node uses the soft modulation, a lower-level node of the upper-level node uses the soft modulation to forward data, to ensure that the data can be continuously forwarded.

Case 1-3: An upper-level node of the node discovers a lower-level node that newly joins, and the lower-level node that newly joins is the node. In the manner, it is mainly ensured that when a new node joins, the new node can maintain a modulation scheme that is the same as that of another node.

Case 1-4: A timer maintained by an upper-level node of the node expires. In the manner, at least one of conditions such as a processing capability of a node, a requirement for synchronization between a plurality of nodes, and a frame format configuration is mainly considered. Under the foregoing conditions, a sending moment of the control signaling nis controlled by using the timer. It may be understood that, that the timer expires may also be understood as that a periodicity is satisfied.

In another possible implementation of the sender of the control information in FIG. 6 or FIG. 7, the sender of the control information is a same-level node of the node. The same-level node of the node may be understood as a same-hop node of the node.

Figure 9A:
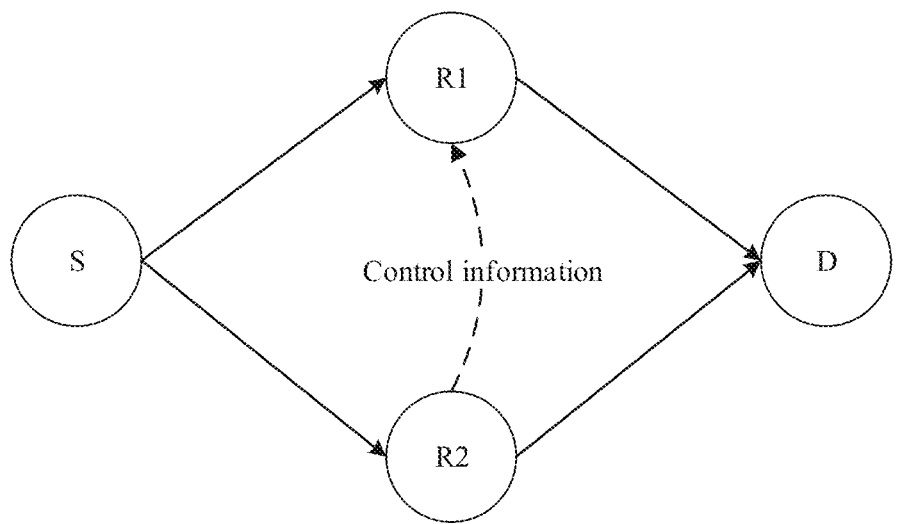
FIG. 9A is a seventh schematic diagram of receiving and sending control information according to an embodiment of this application.

For example, FIG. 9A shows an example in which the sender of the control information is a same-level node of the node. In FIG. 9A, an R1 node is a node that receives the control information, an R2 node is a node that sends the control information, and the R2 node and the R1 node are same-hop nodes.

Figure 9B:
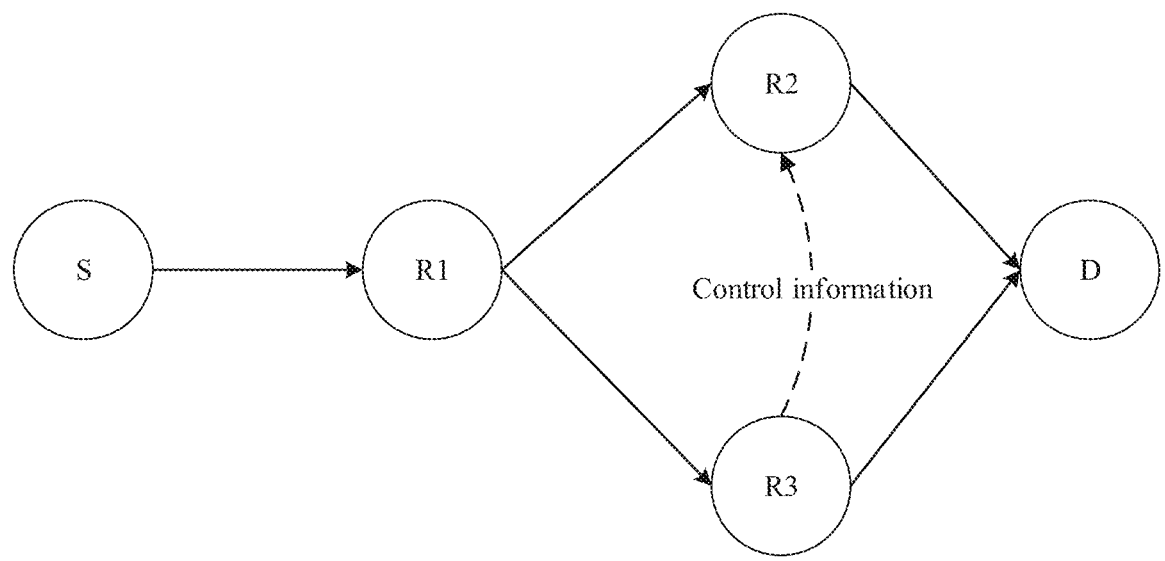
FIG. 9B is an eighth schematic diagram of receiving and sending control information according to an embodiment of this application.

For example, FIG. 9B shows another example in which the sender of the control information is a same-level node of the node. In FIG. 9B, an R2 node is a node that receives the control information, an R3 node is a node that sends the control information, and the R2 node and the R3 node are same-hop nodes.

Figure 9C:
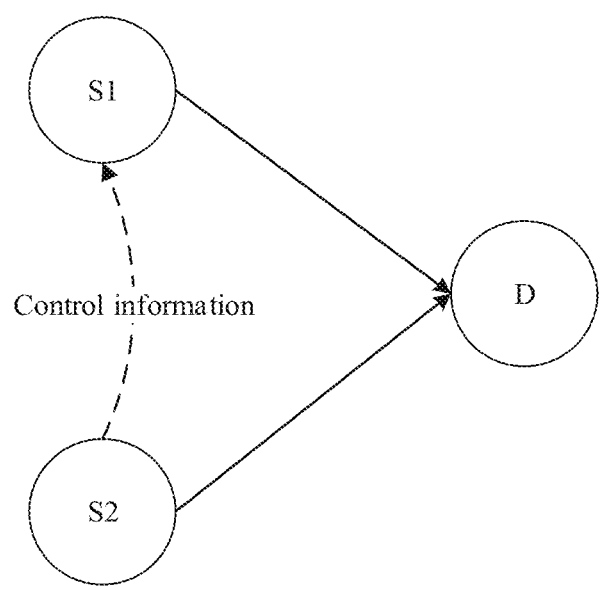
FIG. 9C is a ninth schematic diagram of receiving and sending control information according to an embodiment of this application.

For example, FIG. 9C shows another example in which the sender of the control information is a same-level node of the node. In FIG. 9C, an S1 node is a node that receives the control information, an S2 node is a node that sends the control information, and the S1 node and the S2 node are same-hop nodes.

In the implementation of sending the control information, the same-level node of the node may send, in any one of the following cases to the node, the control information used to indicate the node to enable soft modulation:

Case 2-1: The same-level node of the node receives control information, for enabling the soft modulation, sent by another node. In the manner, the node can forward the control information for enabling the soft modulation, so that effective coverage of the control information is ensured.

Case 2-2: The same-level node of the node fails to demodulate or decode data of an upper-level node of the node. Usually, when a node fails to demodulate or decode data, a same-level node of the node may also fail to decode the data. In the manner, after a node uses the soft modulation, a same-level node of the node also uses the soft modulation to forward the data, to ensure that as many same-level nodes as possible complete data sending.

Case 2-3: The same-level node of the node discovers a same-level node that newly joins, and the same-level node that newly joins is the node. In the manner, it is mainly ensured that when a new node joins, the new node can maintain a modulation scheme that is the same as that of another same-level node.

Case 2-4: The same-level node of the node performs soft modulation. In the manner, a plurality of same-level nodes may perform soft modulation at the same time.

Case 2-5: The same-level node of the node does not perform soft modulation. When there are relatively many same-level nodes, overheads are relatively large if all nodes perform soft modulation at the same time. In the manner, it can be ensured that at least one of same-level nodes performs soft modulation.

Case 2-6: A timer maintained by the same-level node of the node expires. In the manner, at least one of conditions such as a processing capability of a node, a requirement for synchronization between a plurality of nodes, and a frame format configuration is mainly considered. Under the foregoing conditions, a sending moment of the control signaling is controlled by using the timer. It may be understood that, that the timer expires may also be understood as that a periodicity is satisfied.

In the implementation of sending the control information, the same-level node of the node may send, in any one of the following cases to the node, the control information used to indicate the node to disable the soft modulation (that is, enable the hard modulation):

Case 2-7: The same-level node of the node performs hard modulation. In the manner, a plurality of same-level nodes may perform hard modulation at the same time.

Case 2-8: The same-level node of the node does not perform hard modulation. When there are relatively many same-level nodes, overheads are relatively large if all nodes perform soft modulation at the same time. In the manner, it can be ensured that at least one of same-level nodes performs hard modulation.

In still another possible implementation of the sender of the control information in FIG. 6 or FIG. 7, the sender of the control information is a lower-level node of the node. The lower-level node of the node may be understood as a next-hop node or a next-several-hop node of the node.

Figure 10A:
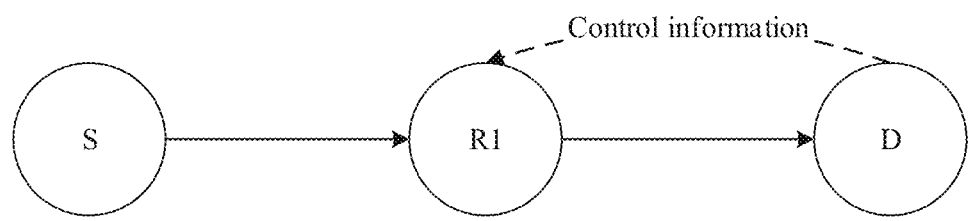
FIG. 10A is a tenth schematic diagram of receiving and sending control information according to an embodiment of this application.

For example, FIG. 10A shows an example in which the sender of the control information is a lower-level node of the node. In FIG. 10A, an R1 node is a node that receives the control information, a D node is a node that sends the control information, and the D node is a next-hop node of the R1 node.

Figure 10B:
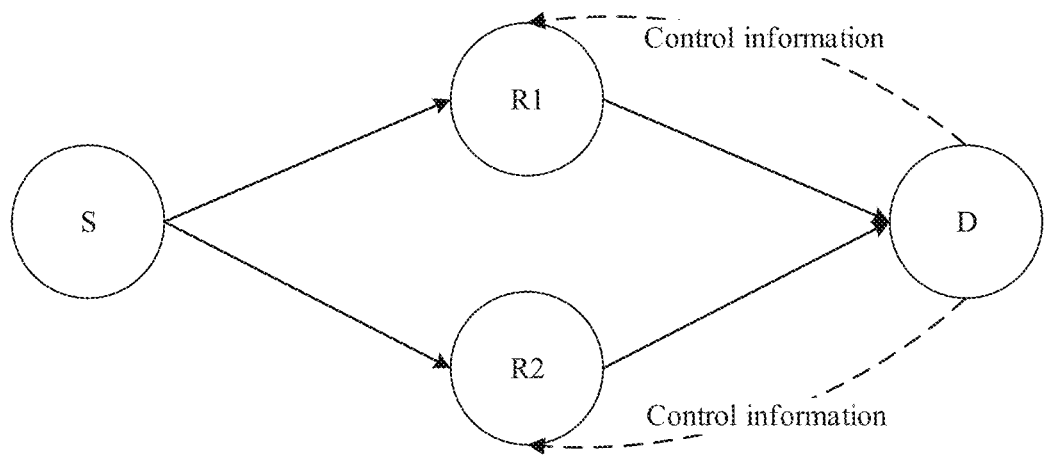
FIG. 10B is an eleventh schematic diagram of receiving and sending control information according to an embodiment of this application.

For example, FIG. 10B shows another example in which the sender of the control information is a lower-level node of the node. In FIG. 10B, an R1 node and an R2 node are nodes that receive the control information, a D node is a node that sends the control information, and the D node is a next-hop node of the R1 node and the R2 node.

Figure 10C:
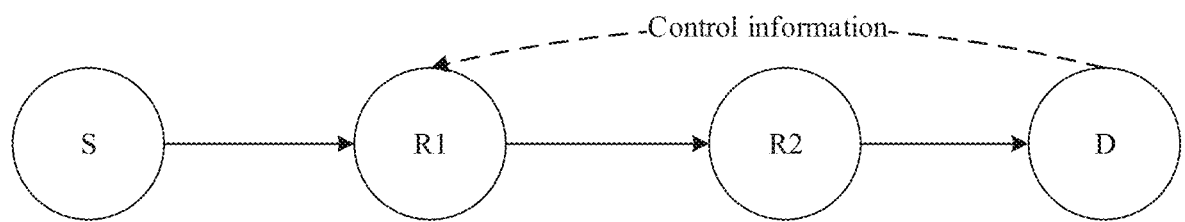
FIG. 10C is a twelfth schematic diagram of receiving and sending control information according to an embodiment of this application.

For example, FIG. 10C shows another example in which the sender of the control information is a lower-level node of the node. In FIG. 10C, an R1 node is a node that receives the control information, a D node is a node that sends the control information, and the D node is a next-two-hop node of the R1 node.

Figure 10D:
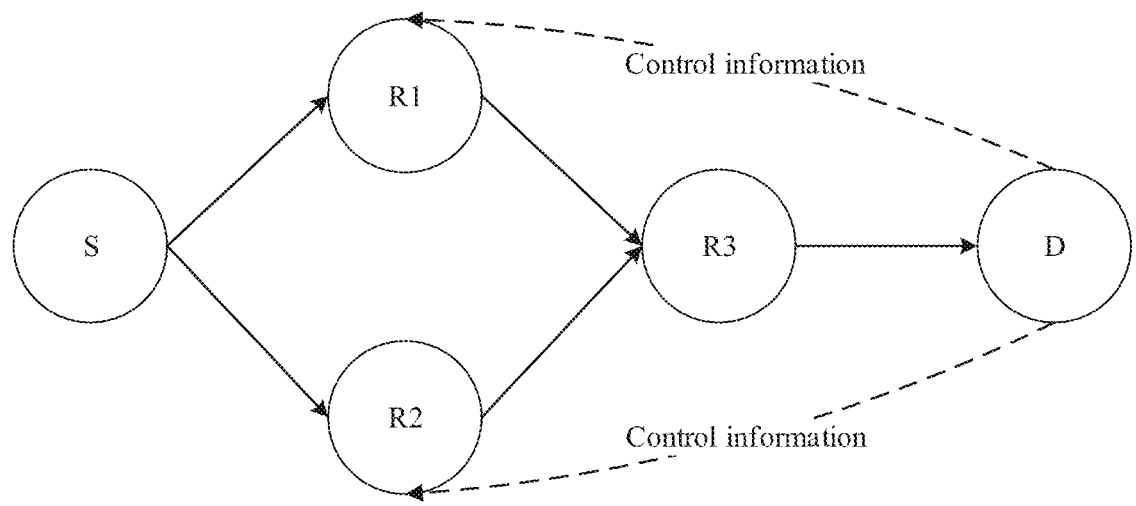
FIG. 10D is a thirteenth schematic diagram of receiving and sending control information according to an embodiment of this application.

For example, FIG. 10D shows another example in which the sender of the control information is a lower-level node of the node. In FIG. 10D, an R1 node and an R2 node are nodes that receive the control information, a D node is a node that sends the control information, and the D node is a next-two-hop node of the R1 node and the R2 node.

Figure 10E:
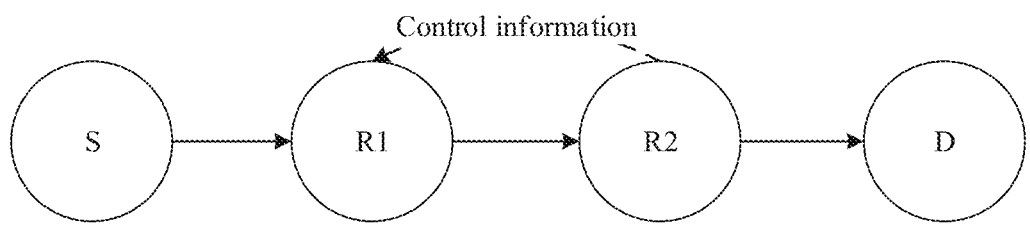
FIG. 10E is a fourteenth schematic diagram of receiving and sending control information according to an embodiment of this application.

For example, FIG. 10E shows another example in which the sender of the control information is a lower-level node of the node. In FIG. 10E, an R1 node is a node that receives the control information, an R2 node is a node that sends the control information, and the R2 node is a next-hop node of the R1 node.

Figure 10F:
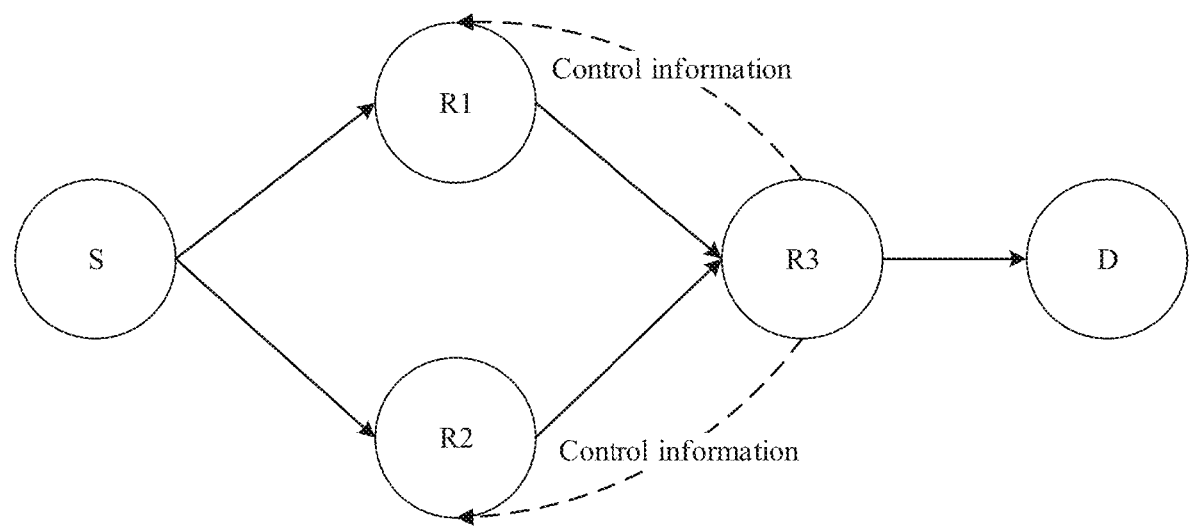
FIG. 10F is a fifteenth schematic diagram of receiving and sending control information according to an embodiment of this application.

For example, FIG. 10F shows another example in which the sender of the control information is a lower-level node of the node. In FIG. 10F, an R1 node and an R2 node are nodes that receive the control information, an R3 node is a node that sends the control information, and the R3 node is a next-hop node of the R1 node and the R2 node.

In the implementation of sending the control information, the lower-level node of the node may send, in any one of the following cases to the node, the control information used to indicate the node to enable soft modulation:

Case 3-1: The lower-level node of the node receives control information, for enabling the soft modulation, sent by another node. In the manner, the node can forward the control information for enabling the soft modulation, so that effective coverage of the control information is ensured.

Case 3-2: The lower-level node of the node fails to demodulate or decode data of an upper-level node of the node. In the manner, after a node fails to demodulate or decode data, the node can notify an upper-level node of the node to use the soft modulation.

Case 3-3: The lower-level node of the node discovers an upper-level node that newly joins, and the upper-level node that newly joins is the node. In the manner, it is mainly ensured that when a new node joins, the new node can maintain a modulation scheme that is the same as that of another node.

Case 3-4: A timer maintained by the lower-level node of the node expires. In the manner, at least one of conditions such as a processing capability of a node, a requirement for synchronization between a plurality of nodes, and a frame format configuration is mainly considered. Under the foregoing conditions, a sending moment of the control signaling is controlled by using the timer. It may be understood that, that the timer expires may also be understood as that a periodicity is satisfied.

In another possible implementation of enabling or disabling the soft modulation, the node receives control information, and determines, based on the control information and a code check result, to generate the modulation symbol based on the first data and/or the second data. The implementation may be understood as that, based on the control information, the node further enables or disables the foregoing soft modulation with reference to the code check result. The code check may be cyclic redundancy check (cyclic redundancy check, CRC) of data, or may be scrambling code check of data, or may be other code check of data. This is not limited in this embodiment of this application.

For example, if the control information indicates that the node may use the soft modulation, and the code check of the node fails, the node modulates, according to the foregoing soft modulation method in the embodiments of this application, the first data and/or the second data, to generate the modulation symbol (which may be understood as a soft modulation symbol).

For example, if the control information indicates that the node may use the soft modulation, and the code check of the node succeeds, the node modulates a common bit (which may be understood as a hard bit, namely, 0 or 1) and/or a common symbol (which may be understood as a hard symbol, namely, −1 or 1), to generate a common modulation symbol (which may be understood as a hard modulation symbol).

For example, if the control information indicates that the node is not allowed to use the soft modulation, and the code check of the node fails, the node modulates a common bit (which may be understood as a hard bit, namely, 0 or 1) and/or a common symbol (which may be understood as a hard symbol, namely, −1 or 1), to generate a common modulation symbol (which may be understood as a hard modulation symbol).

For example, if the control information indicates that the node is not allowed to use the soft modulation, and the code check of the node succeeds, the node modulates a common bit (which may be understood as a hard bit, namely, 0 or 1) and/or a common symbol (which may be understood as a hard symbol, namely, −1 or 1), to generate a common modulation symbol (which may be understood as a hard modulation symbol).

In the implementation, when hard modulation and soft modulation coexist, the node can be notified of an available modulation scheme, and at the same time, the node can determine, according to a code check result of data, a modulation scheme to be used, thereby further enhancing robustness of data sending.

Figure 11:
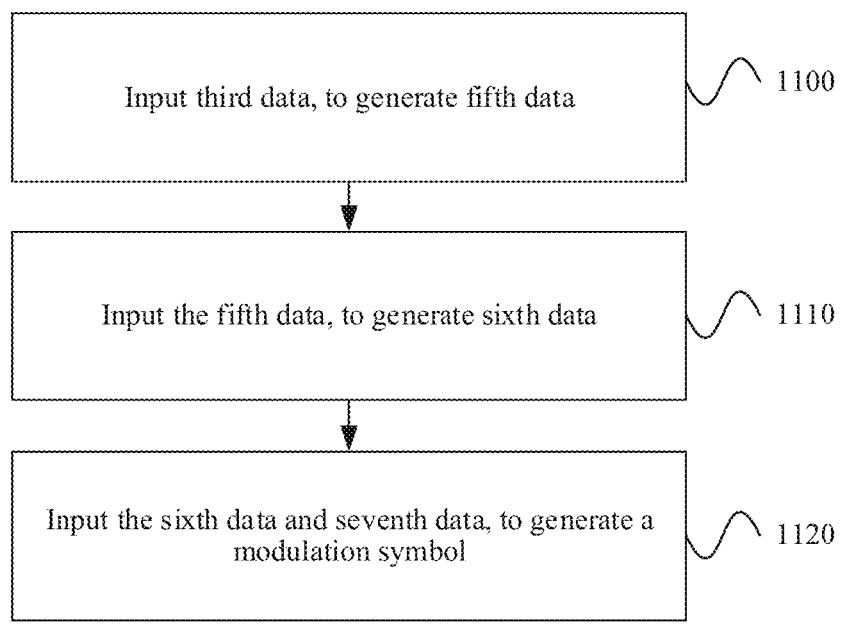
FIG. 11 is a flowchart of a method for generating a modulation symbol according to an embodiment of this application.

The modulation symbol in part 400 of FIG. 4 may alternatively be obtained in another implementation, for example, the node obtains the modulation symbol based on third data, where the third data is original soft information obtained by the node by demodulating or decoding data of a previous sending node. FIG. 11 is a flowchart of a method performed by the node in the implementation. The flowchart includes part 1100, part 1110, and part 1120.

Part 1100: Input third data, to generate fifth data. The third data includes one or more fifth real numbers L ($b_i$), where i is an integer greater than 0 and less than I+1, and a value of I may be understood as a quantity of the fifth real numbers. The value of I is equal to a quantity of bits required for generating a hard modulation symbol. For example, when BPSK is used, the value of I is 1 (indicating that one bit is required for generating one BPSK modulation symbol). When QPSK is used, the value of I is 2 (indicating that two bits are required for generating one QPSK modulation symbol). When 16QAM is used, the value of I is 4 (indicating that four bits are required for generating a 16QAM modulation symbol). When 64QAM is used, the value of I is 6 (indicating that six bits are required for generating a 64QAM modulation symbol). The fifth data includes 2I sixth real numbers, where an $i^{th}$ sixth real number $P(b_i=1)$ in I sixth real numbers satisfies $P(b_i=1)=e^{L(b_i)}/(1+e^{L(b_i)})$ (which may be understood as a probability that an $i^{th}$ bit for generating a hard modulation symbol is 1). In addition, an $i^{th}$ sixth real number $P(b_i=0)$ in the I sixth real numbers satisfies $P(b_i=0)=1/(1+e^{L(b_i)})$ (which may be understood as a probability that an $i^{th}$ bit for generating a hard modulation symbol is 0).

Part 1110: Input the fifth data, to generate sixth data. The sixth data includes one or more seventh real numbers $P(Q_e)$, and the seventh real number satisfies $P(Q_e)=\Pi_{i=1}^{I} P(b_i=Q_{e,i})$, where $Q_{e,i}$ represents a value (namely, 0 or 1) of the $i^{th}$ bit for generating the hard modulation symbol $Q_e$, $P(b_i=Q_{e,i})$ (namely, $P(b_i=1)$ or $P(b_i=0)$) is the sixth real number included in the fifth data, a symbol $\Pi_{i=1}^{I} y_i$ represents a continuous multiplication operation (namely, $y_1 \times \ldots \times y_I$), e is an integer greater than 0 and less than E+1, and a value of E may be understood as a quantity of the seventh real numbers. The value of E is equal to a quantity of all possible hard modulation symbols corresponding to a modulation scheme (which may also be understood as a quantity of modulation constellation points corresponding to hard modulation symbols). For example, when BPSK is used, the value of E is 2 (where BPSK modulation has a total of two modulation constellation points); when QPSK is used, the value of E is 4 (where QPSK modulation has a total of four modulation constellation points); when 16QAM is used, the value of E is 16 (where 16QAM modulation has a total of 16 modulation constellation points); and when 64QAM is used, the value of E is 64 (where 64QAM modulation has a total of 64 modulation constellation points). The seventh real number $P(Q_e)$ included in the sixth data may be understood as a probability of generating an $e^{th}$ hard modulation symbol $Q_e$ in a modulation scheme.

Part 1120: Input the sixth data and seventh data to generate a modulation symbol. The modulation symbol is a soft modulation symbol, and may also be considered as a first complex number. The seventh data includes one or more second complex numbers $Q_e$, and $Q_e$ may be considered as an $e^{th}$ hard modulation symbol in a modulation scheme. The seventh real number $P(Q_e)$ included in the sixth data and the second complex number $Q_e$ included in the seventh data satisfy $\hat{Q}=\Sigma_{e=1}^{E} Q_e \cdot P(Q_e)$ with the generated modulation symbol Q. A symbol $\Sigma_{e=1}^{E} x_e$ represents a continuous addition operation (namely, $x_1 + \ldots + x_E$).

The following uses QPSK soft modulation symbol generation as an example to describe the foregoing process. In the QPSK modulation scheme, values of the parameters involved in the foregoing process are: I=2, 2I=4, E=4, a value of i is 1 or 2, and a value of e is 1, 2, 3, or 4.

In part 1100, the third data includes two fifth real numbers $L(b_1)$ and $L(b_2)$. Based on the descriptions in part 1100, the two fifth real numbers $L(b_1)$ and $L(b_2)$ are input, to generate fifth data including four sixth real numbers. The four sixth real numbers $P(b_1=1)$, $P(b_1=0)$, $P(b_2=1)$, and $P(b_2=0)$ respectively satisfy $P(b_1=1)=e^{L(b_1)}/(1+e^{L(b_1)})$, $P(b_1=0)=1/(1+e^{L(b_1)})$, $P(b_2=1)=e^{L(b_2)}/(1+e^{L(b_2)})$, and $P(b_2=0)=1/(1+e^{L(b_2)})$.

In part 1110, the four sixth real numbers $P(b_1=1)$, $P(b_1=0)$, $P(b_2=1)$, and $P(b_2=0)$ included in the fifth data are input, to generate sixth data including four seventh real numbers. The four seventh real numbers are $P(Q_1)$, $P(Q_2)$, $P(Q_3)$, and $P(Q_4)$, where $Q_1$, $Q_2$, $Q_3$, and $Q_4$ respectively represent four modulation constellation points (which may also be understood as hard modulation symbols) corresponding to QPSK hard modulation. Referring to a QPSK modulation constellation diagram schematically shown in FIG. 13C, an example in which a modulation constellation point in the top-right corner is $Q_1$, a modulation constellation point in the bottom-right corner is $Q_2$, a modulation constellation point in the bottom-left corner is $Q_3$, and a modulation constellation point in the top-left corner is $Q_4$. In this case, a value of the $1^{st}$ bit $Q_{1,1}$ for generating $Q_1$ is 0 (namely, $Q_{1,1}=0$), a value of the $2^{nd}$ bit $Q_{1,2}$ for generating $Q_1$ is 0 (namely, $Q_{1,2}=0$), a value of the $1^{st}$ bit $Q_{2,1}$ for generating $Q_2$ is 0 (namely, $Q_{2,1}=0$), a value of the $2^{nd}$ bit $Q_{2,2}$ for generating $Q_2$ is 1 (namely, $Q_{2,2}=1$), a value of the $1^{st}$ bit $Q_{3,1}$ for generating $Q_3$ is 1 (namely, $Q_{3,1}=1$), a value of the $2^{nd}$ bit $Q_{3,2}$ for generating $Q_3$ is 1 (namely, $Q_{3,2}=1$), a value of the $1^{st}$ bit $Q_{4,1}$ for generating $Q_4$ is 1 (namely, $Q_{4,1}=1$), and a value of the $2^{nd}$ bit $Q_{4,2}$ for generating $Q_4$ is 0 (namely, $Q_{4,2}=0$). In this case, the four seventh real numbers $P(Q_1)$, $P(Q_2)$, $P(Q_3)$, and $P(Q_4)$ included in the sixth data and the four sixth real numbers $P(b_1=1)$, $P(b_1=0)$, $P(b_2=1)$, and $P(b_2=0)$ included in the fifth data satisfy the following four equations:

$$P(Q_1)=\Pi_{i=1}^{2}P(b_i=Q_{1,i})=P(b_1=Q_{1,1})\times P(b_2=Q_{1,2})=P(b_1=0)\times P(b_2=0);$$

$$P(Q_2)=\Pi_{i=1}^{2}P(b_i=Q_{2,i})=P(b_1=Q_{2,1})\times P(b_2=Q_{2,2})=P(b_1=0)\times P(b_2=1);$$

$$P(Q_3)=\Pi_{i=1}^{2}P(b_i=Q_{3,i})=P(b_1=Q_{3,1})\times P(b_2=Q_{3,2})=P(b_1=1)\times P(b_2=1); \text{ and}$$

$$P(Q_4)=\Pi_{i=1}^{2}P(b_i=Q_{4,i})=P(b_1=Q_{4,1})\times P(b_2=Q_{4,2})=P(b_1=1)\times P(b_2=0).$$

In part 1120, four seventh real numbers $P(Q_1)$, $P(Q_2)$, $P(Q_3)$, and $P(Q_4)$ included in the sixth data and four second complex numbers $Q_1$, $Q_2$, $Q_3$, and $Q_4$ included in the seventh data are input, to generate a first complex number $\hat{Q}$ (namely, a soft modulation symbol), where $\hat{Q}$ satisfies the following equation with $P(Q_1)$, $P(Q_2)$, $P(Q_3)$, and $P(Q_4)$, and $Q_1$, $Q_2$, $Q_3$, and $Q_4$:

$$\hat{Q}=\Sigma_{e=1}^{4}Q_e\cdot P(Q_e)=Q_1\cdot P(Q_1)+Q_2\cdot P(Q_2)+Q_3\cdot P(Q_3)+Q_4\cdot P(Q_4).$$

It may be understood that the implementation schematically shown in FIG. 4 in this application may be understood as a simplified implementation of the implementation schematically shown in FIG. 11. The two implementations may be implemented independently, or may be mutually referenced. For example, in an optional manner, for an implementation of quantizing the third data described in the implementation schematically shown in FIG. 4, for example, selection of a quantization value, refer to the fifth data or the sixth data obtained in the implementation schematically shown in FIG. 11.

Figure 12:
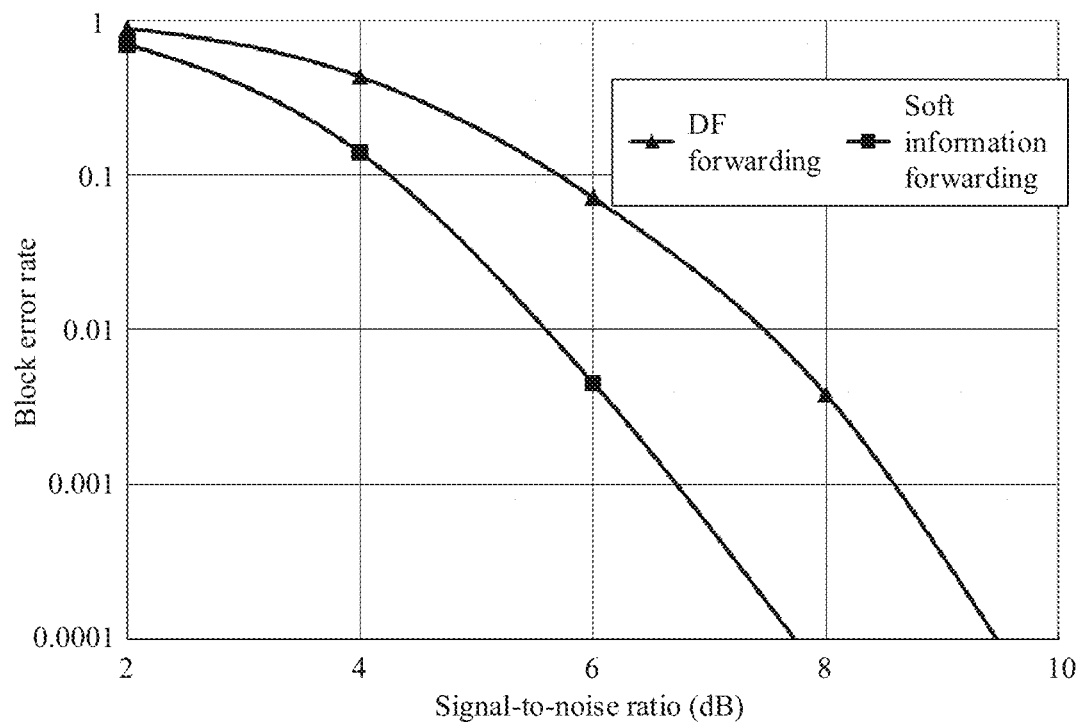
FIG. 12 is a performance diagram of a data sending method and a DF sending method according to an embodiment of this application.

According to the data sending method that is schematically shown in FIG. 4 and that is provided in the embodiments of this application, when a forwarding node incorrectly decodes data of a previous sending node, the forwarding node can still forward the data, thereby improving forwarding performance. FIG. 12 is a schematic diagram of performance comparison between a data sending method and a DF data sending method according to an embodiment of this application. It can be learned from FIG. 12 that, in comparison with the DF forwarding method, the data sending method (namely, soft information forwarding schematically shown in FIG. 12) provided in this embodiment of this application can reduce a block error rate, thereby improving forwarding performance.

According to the soft modulation method provided in part 400 in FIG. 4 in the embodiments of this application, more possible modulation constellation points can be generated on a complex plane.

Figure 13A:
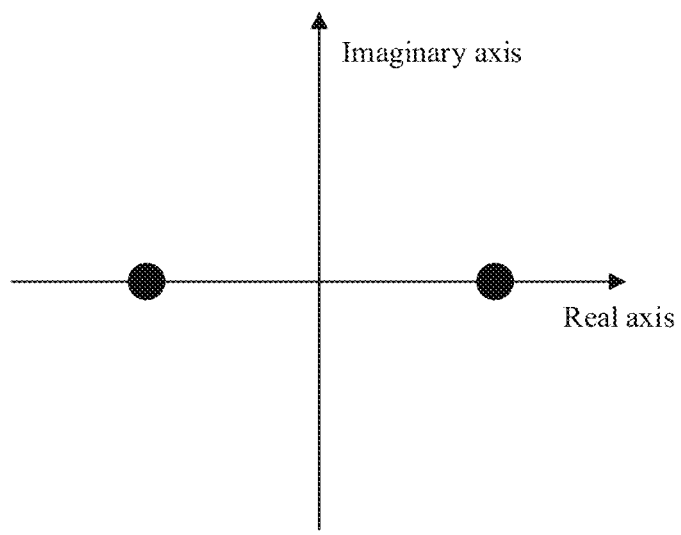
FIG. 13A is a schematic diagram of BPSK hard modulation constellation points.

A BPSK modulation scheme is used as an example. BPSK hard modulation can generate only one of two constellation points on a real axis of a complex plane (as shown in FIG. 13A). However, according to the soft modulation method provided in this embodiment of this application, BPSK soft modulation can generate two constellation points on the real axis of the complex plane, and any constellation point on a connection line between the two constellation points (as shown in FIG. 13B, where any constellation point on the connection line between the two constellation points is indicated in a shadow of slashes).

A QPSK modulation scheme is used as an example. QPSK hard modulation can generate only one of four constellation points on a complex plane (as shown in FIG. 13C). However, according to the soft modulation method provided in this embodiment of this application, QPSK soft modulation can generate four constellation points on the complex plane, and any constellation point on a plane including the four constellation points (as shown in FIG. 13D, where any constellation point on the plane including the four constellation points is indicated in a shadow of slashes).

Figure 13B:
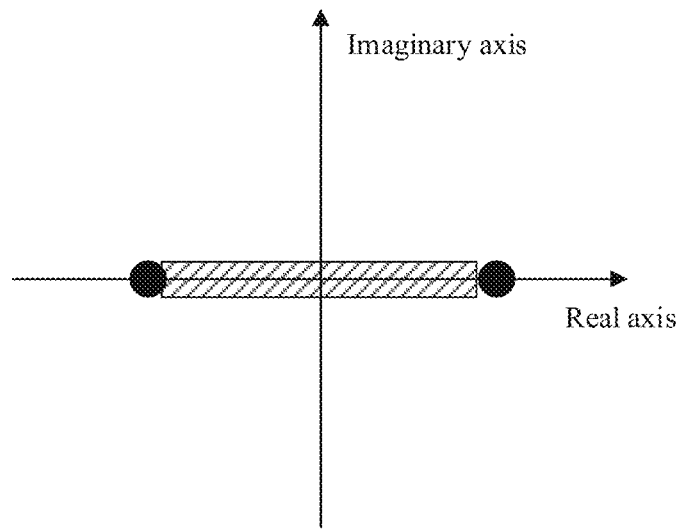
FIG. 13B is a schematic diagram of BPSK soft modulation constellation points.
Figure 13C:
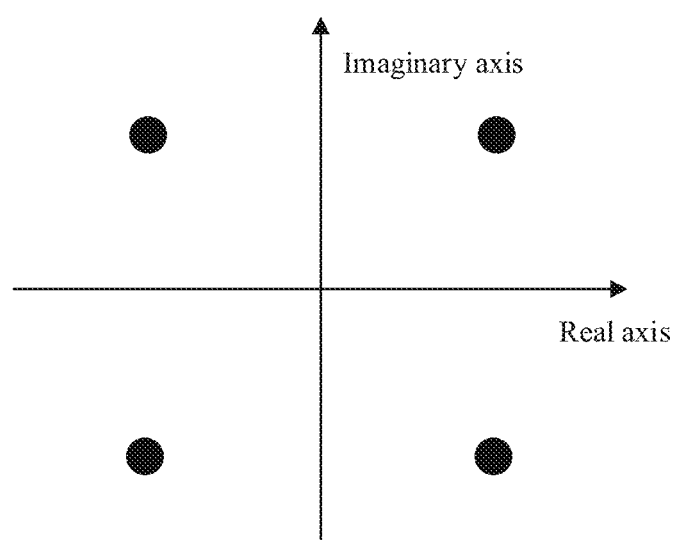
FIG. 13C is a schematic diagram of QPSK hard modulation constellation points.
Figure 13D:
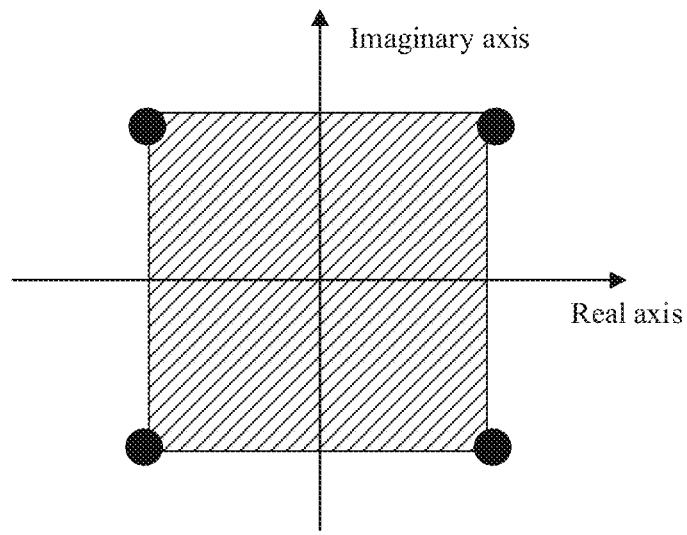
FIG. 13D is a schematic diagram of QPSK soft modulation constellation points.
Figure 13E:
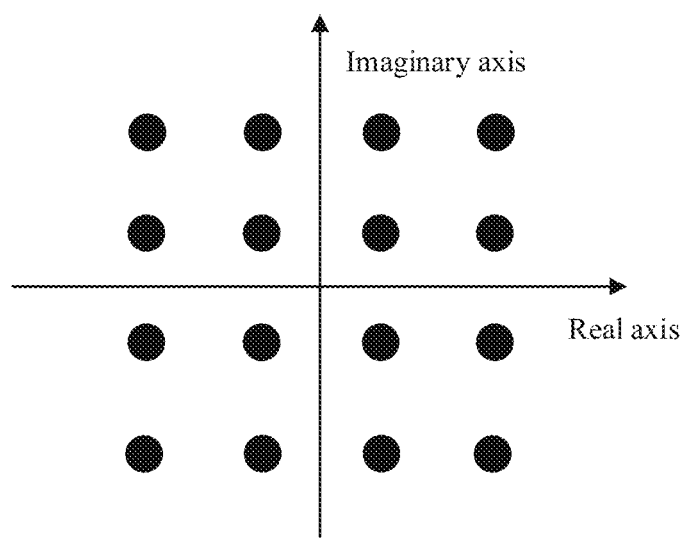
FIG. 13E is a schematic diagram of 16QAM hard modulation constellation points.

A 16QAM modulation scheme is used as an example. 16QAM hard modulation can generate only one of 16 constellation points on a complex plane (as shown in FIG. 13E). However, according to the soft modulation method provided in this embodiment of this application, 16QAM soft modulation can generate 16 constellation points on the complex plane, and any constellation point on a plane including constellation points, in four corners, in the 16 constellation points (as shown in FIG. 13F, where any constellation point on the plane including the constellation points in the four corners is indicated in a shadow of slashes).

Figure 13F:
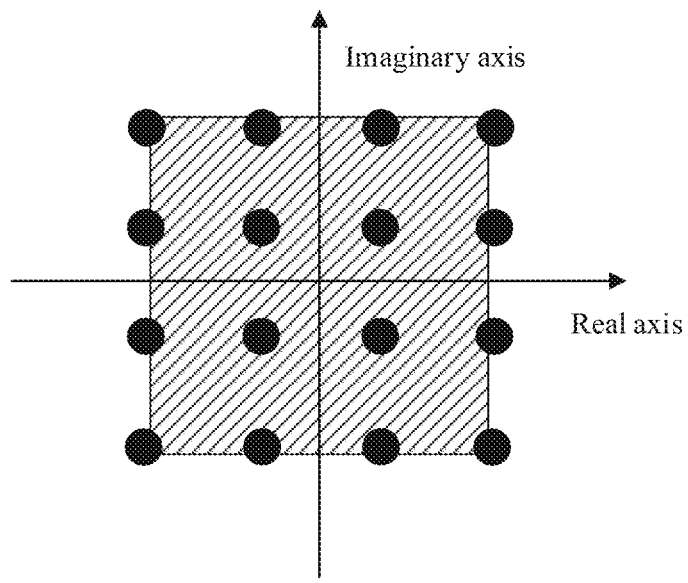
FIG. 13F is a schematic diagram of 16QAM soft modulation constellation points.

It may be understood that schematic diagrams of the modulation constellation points that are provided in the embodiments of this application and that are schematically shown in FIG. 13B, FIG. 13D, and FIG. 13F are also applicable to other modulation schemes, for example, 64QAM, 256QAM, 512QAM, 1024QAM, and pi/2-BPSK.

It may be understood that soft modulation and hard modulation are merely names of two different modulation schemes in the embodiments of this application, and do not affect the protection scope of the embodiments of this application. Any modulation scheme that is substantially the same as but has a different name from the modulation schemes in the embodiments of this application falls within the protection scope of this application.

The correspondences shown in the foregoing tables may be configured, or may be predefined. Values of the indication information in the tables are merely examples, and other values may be configured. This is not limited in this application. When a correspondence between indication information and each parameter is configured, not all the correspondences shown in the tables need to be configured. For example, in the foregoing tables, correspondences shown in some rows may not be configured. For another example, proper transformation and adjustments such as splitting and combination may be performed based on the foregoing tables. Names of the parameters shown in titles of the foregoing tables may alternatively be other names that can be understood by a communications device, and values or representation manners of the parameters may alternatively be other values or representation manners that can be understood by the communications device. During implementation of the foregoing tables, another data structure, such as an array, a queue, a container, a stack, a linear table, a pointer, a linked list, a tree, a graph, a structure, a class, a pile, or a hash table, may be used.

"Default" in this application may be understood as "tacitly approved" or "preset". A default value in this application is a predefined value, a tacitly approved value, or a preset value. The non-default value in this application is a value other than the foregoing default value. It may be understood that a specific value of the default value is not limited in this application.

"Predefine" mentioned this application may be understood as "define", "predefine", "store", "pre-store", "pre-negotiate", "pre-configure", "solidify", or "pre-burn".

The relay node in this application may also be sometimes referred to as a forwarding node, and this does not affect understanding of a technical meaning of the relay node.

The description in this application that a satisfies a mapping relationship with b (which may also be understood as a functional relationship) does not forcibly require that a accurately satisfy the mapping relationship with b. For example, if a value a' accurately satisfies the mapping relationship with the value b, a value a obtained after an operation of floating-point removal, rounding, or rounding off is performed on the value a' may also be understood as that a satisfies the mapping relationship with b. It may be understood that, that a satisfies a mapping relationship with b may alternatively be that a and b satisfy a mapping relationship obtained after equivalent transformation is performed on the mapping relationship. This is not limited in the embodiments of this application. In addition, it may be understood that an implementation in which a satisfies a mapping relationship with b is not limited in the embodiments of this application. For example, the mapping manner may be implemented by using a formula, or the mapping manner may be implemented in a form of a table, or the mapping manner may be implemented in another manner. This is not limited in the embodiments of this application.

It may be understood that the methods implemented by the communications device in the foregoing method embodiments may alternatively be implemented by a component (for example, an integrated circuit or a chip) that can be used in the communications device.

In correspondence to the wireless communication methods provided in the foregoing method embodiments, an embodiment of this application further provides a corresponding communications apparatus (which may also be referred to as a communications device). The communications apparatus includes a corresponding module configured to perform each part in the foregoing embodiments. The module may be software, hardware, or a combination of software and hardware.

Figure 14:
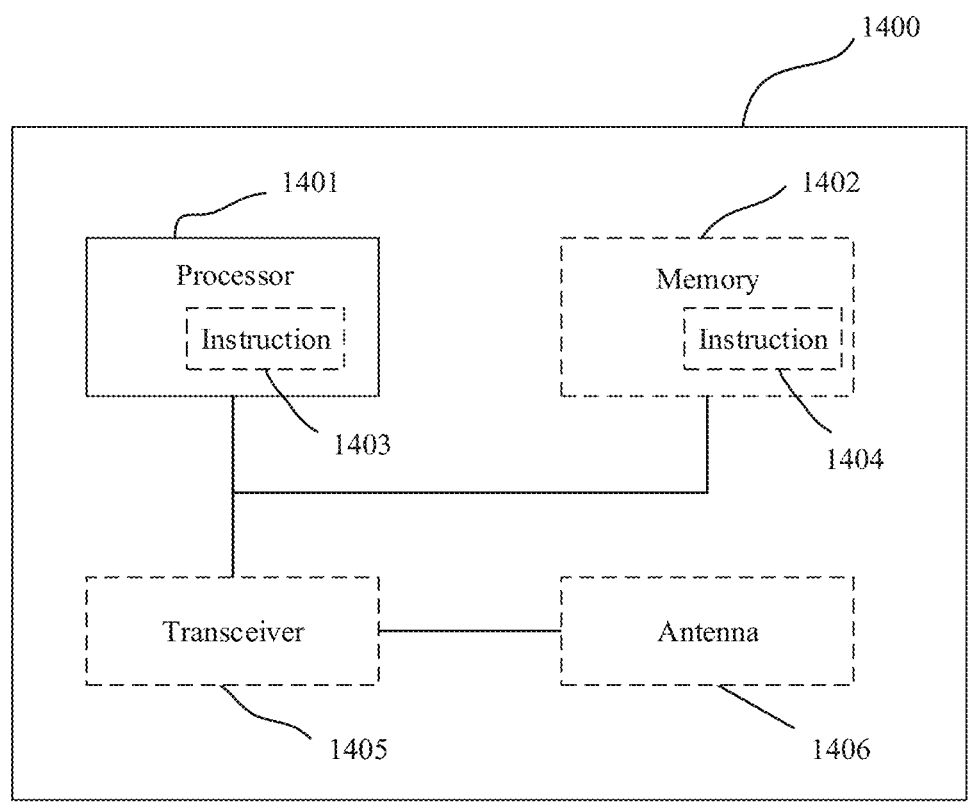
FIG. 14 is a schematic structural diagram of a communications apparatus according to an embodiment of this application.

FIG. 14 is a schematic structural diagram of a communications apparatus. The communications apparatus 1400 may be the network device 10 or 20 in FIG. 1, or may be the terminal device 11, 12, 21, or 22 in FIG. 1. It may be understood that the network device and the terminal schematically shown in FIG. 1 may also be referred to as nodes. The communications apparatus may be configured to implement the methods that correspond to the communications device (which may also be referred to as a node) and that are described in the foregoing method embodiments. For details, refer to the descriptions in the foregoing method embodiments.

The communications apparatus 1400 may include one or more processors 1401. The processor 1401 may also be referred to as a processing unit, and may implement a control function. The processor 1401 may be a general-purpose processor, a dedicated processor, or the like. For example, the processor 1401 may be a baseband processor or a central processing unit. The baseband processor may be configured to process a communication protocol and communications data. The central processing unit may be configured to: control a communications apparatus (for example, a base station, a baseband chip, a DU, or a CU), execute a software program, and process data of the software program.

In an optional design, the processor 1401 may also store an instruction and/or data 1403. The instruction and/or data 1403 may be run by the processor, so that the communications apparatus 1400 performs the methods that correspond to the communications device and that are described in the foregoing method embodiments.

In another optional design, the processor 1401 may include a transceiver unit configured to implement a receiving function and a sending function. For example, the transceiver unit may be a transceiver circuit or an interface. A circuit or an interface configured to implement the receiving function and a circuit or an interface configured to implement the sending function may be separated or may be integrated together.

In another possible design, the communications apparatus 1400 may include a circuit, and the circuit may implement the sending, receiving, or communication function in the foregoing method embodiments.

Optionally, the communications apparatus 1400 may include one or more memories 1402. The memory stores an instruction 1404, and the instruction may be run on the processor, so that the communications apparatus 1400 performs a method described in the foregoing method embodiments. Optionally, the memory may further store data. Optionally, the processor may further store an instruction and/or data. The processor and the memory may be separately disposed, or may be integrated together. For example, various correspondences described in the foregoing method embodiments may be stored in the memory, or may be stored in the processor.

Optionally, the communications apparatus 1400 may further include a transceiver 1405 and/or an antenna 1406. The processor 1401 may be referred to as a processing unit, and controls the communications apparatus (a terminal or a network device). The transceiver 1405 may be referred to as a transceiver unit, a transceiver machine, a transceiver circuit, a transceiver, or the like, and is configured to implement receiving and sending functions of the communications apparatus.

In a possible design, a communications apparatus 1400 (for example, an integrated circuit, a wireless device, a circuit module, a network device, or a terminal) may include a processor 1401 and a transceiver 1405. The processor 1401 generates a modulation symbol based on first data and/or second data, where the modulation symbol satisfies a mapping relationship with the first data and/or the second data. The first data includes one or more first real numbers, and the first real number is greater than 0 and less than 1. The second data includes one or more second real numbers, and the second real number is greater than −1 and less than 1. The processor 1401 preprocesses the modulation symbol to obtain fourth data, where the preprocessing includes one or more of layer mapping, antenna port mapping, precoding, or transform precoding. The processor 1401 maps the fourth data to a physical resource, and the transceiver 1405 sends the fourth data on the physical resource.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an n-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal as an example. However, a scope of the communications apparatus described in this application is not limited to the example, and the structure of the communications apparatus may not be limited by FIG. 14. The communications apparatus may be an independent device or may be a part of a relatively large device. For example, the device may be:

(1) an independent integrated circuit IC, a chip, or a chip system or subsystem;

(2) a set including one or more ICs, where optionally, the IC set may alternatively include a storage component configured to store data and/or an instruction;

(3) an ASIC, for example, a modem (MSM);

(4) a module that can be embedded in another device;

(5) a receiver machine, a terminal, an intelligent terminal, a cellular phone, a wireless device, a handheld phone, a mobile unit, a vehicle-mounted device, a network device, a cloud device, an artificial intelligence device, or the like;

(6) another device; or the like.

Figure 15:
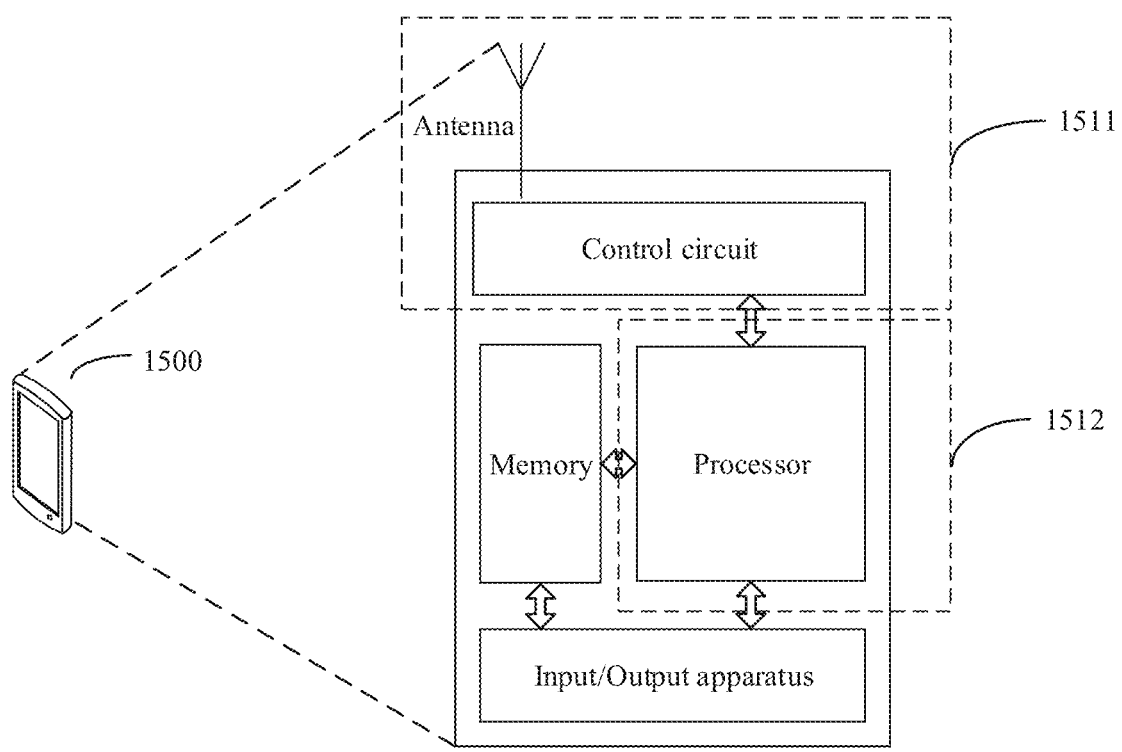
FIG. 15 is a schematic structural diagram of a terminal according to an embodiment of this application.

FIG. 15 is a schematic structural diagram of a terminal. The terminal is applicable to the system shown in FIG. 1. For ease of description, FIG. 15 shows only main components of the terminal. As shown in FIG. 15, the terminal 1500 includes a processor, a memory, a control circuit, an antenna, and an input/output apparatus. The processor is mainly configured to: process a communications protocol and communications data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to: receive data entered by a user, and output data to the user.

After user equipment is turned on, the processor may read a software program stored in a storage unit, parse and execute an instruction of the software program, and process data of the software program. When data is to be sent wirelessly, after performing baseband processing on the to-be-sent data, the processor outputs a baseband signal to a radio frequency circuit. After processing the baseband signal, the radio frequency circuit obtains a radio frequency signal and sends the radio frequency signal to the outside through an antenna in a form of an electromagnetic wave. When data is sent to the user equipment, the radio frequency circuit receives the radio frequency signal by using the antenna, further converts the radio frequency signal into a baseband signal, and outputs the baseband signal to the processor, and the processor converts the baseband signal into data and processes the data.

A person skilled in the art may understand that for ease of description, FIG. 15 shows only one memory and one processor. An actual terminal may include a plurality of processors and a plurality of memories. The memory may also be referred to as a storage medium, a storage device, or the like. This is not limited in this embodiment.

In an optional implementation, the processor may include a baseband processor and a central processing unit. The baseband processor is mainly configured to process the communications protocol and the communications data, and the central processing unit is mainly configured to: control the entire terminal, execute the software program, and process the data of the software program. Functions of the baseband processor and the central processing unit are integrated into the processor in FIG. 15. A person skilled in the art may understand that the baseband processor and the central processing unit each may be an independent processor, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have receiving and sending functions may be considered as a transceiver unit 1511 of the terminal 1500, and the processor having a processing function may be considered as a processing unit 1512 of the terminal 1500. As shown in FIG. 15, the terminal 1500 includes the transceiver unit 1511 and the processing unit 1512. The transceiver unit may also be referred to as a transceiver, a transceiver machine, a transceiver apparatus, or the like. Optionally, a component that is in the transceiver unit 1511 and that is configured to implement a reception function may be considered as a receiving unit, and a component that is in the transceiver unit 1511 and that is configured to implement a transmission function may be considered as a sending unit. In other words, the transceiver unit 1511 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be integrated into one unit, or may be a plurality of units independent of each other. The receiving unit and the sending unit may be located at one geographical location, or may be scattered at a plurality of geographical locations.

Figure 16:
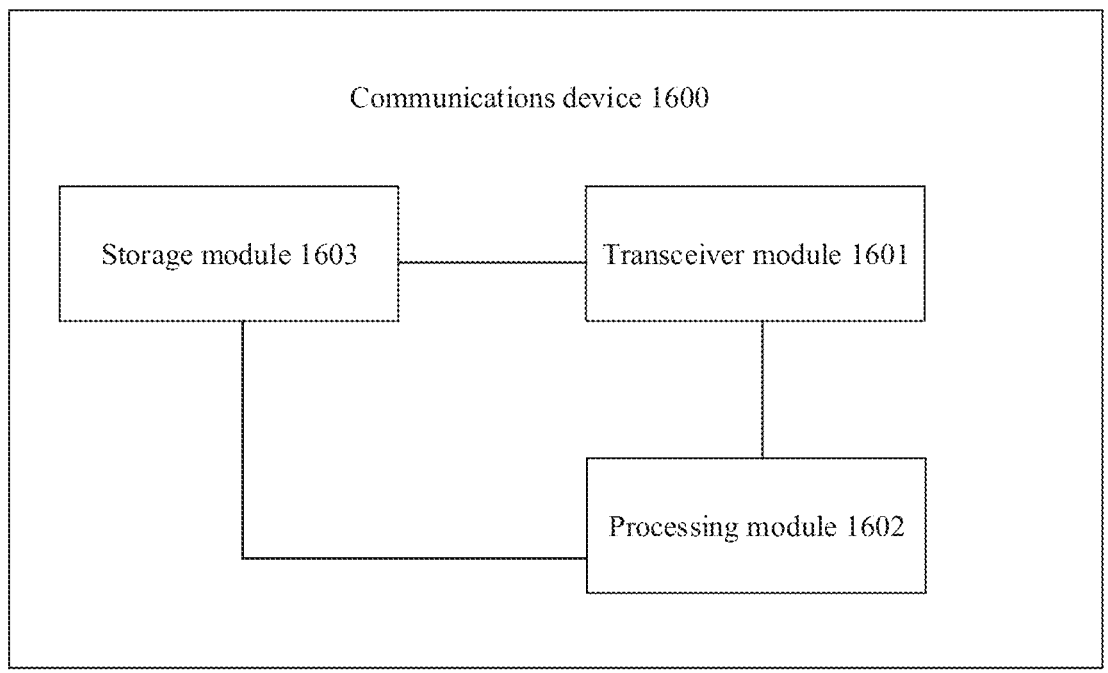
FIG. 16 is a schematic diagram of a communications device according to an embodiment of this application.

As shown in FIG. 16, another embodiment of this application provides a communications apparatus (which may also be referred to as a communications device or a node) 1600. The communications apparatus may be a terminal (for example, a terminal in the system shown in FIG. 1) or a component (for example, an integrated circuit or a chip) of a terminal. Alternatively, the communications apparatus may be a network device (where for example, the communications apparatus is a base station device that can be used in the system in FIG. 1) or a component (for example, an integrated circuit or a chip) of a network device. Alternatively, the communications apparatus may be another communications module, configured to implement an operation corresponding to the communications device in the method embodiments of this application. The communications apparatus 1600 may include a processing module 1602 (a processing unit). Optionally, the communications apparatus may further include a transceiver module 1601 (a transceiver unit) and a storage module 1603 (a storage unit).

In a possible design, one or more modules in FIG. 16 may be implemented by one or more processors, or may be implemented by one or more processors and one or more memories, or may be implemented by one or more processors and one or more transceivers, or may be implemented by one or more processors, one or more memories, and one or more transceivers. This is not limited in this embodiment of this application. The processor, the memory, and the transceiver may be separately disposed, or may be integrated together.

The communications apparatus has a function of implementing the terminal described in the embodiments of this application. For example, the communications apparatus includes modules, units, or means that are of the terminal and that correspond to the steps performed by the terminal described in the embodiments of this application, and the functions, units, or means may be implemented by software, may be implemented by hardware, or may be implemented by hardware executing corresponding software. For details, refer to corresponding descriptions in the foregoing corresponding method embodiments.

Alternatively, the communications apparatus has a function of implementing the network device described in the embodiments of this application. For example, the communications apparatus includes modules, units, or means corresponding to the steps performed by the network device described in the embodiments of this application, and the functions, units, or means may be implemented by using software, may be implemented by hardware, or may be implemented by hardware executing corresponding software. For details, refer to corresponding descriptions in the foregoing corresponding method embodiments.

Optionally, the modules in the communications apparatus 1600 in this embodiment of this application may be configured to perform the method described in FIG. 4 in the embodiments of this application.

In a possible implementation, the processing module 1602 generates a modulation symbol based on first data and/or second data, where the modulation symbol satisfies a mapping relationship with the first data and/or the second data. The first data includes one or more first real numbers, and the first real number is greater than 0 and less than 1. The second data includes one or more second real numbers, and the second real number is greater than −1 and less than 1. The processing module 1602 preprocesses the modulation symbol to obtain fourth data, where the preprocessing includes one or more of layer mapping, antenna port mapping, precoding, or transform precoding. The processing module 1602 maps the fourth data to a physical resource, and the transceiver module 1601 sends the fourth data on the physical resource.

That the processing module 1602 generates a modulation symbol based on first data and/or second data may also be understood as inputting the first data and/or the second data to generate the modulation symbol.

According to the data sending apparatus provided in the embodiments of this application, data generated through soft modulation is sent, so that when a forwarding node incorrectly decodes data of a previous sending node, the forwarding node can still forward the data, thereby improving forwarding performance.

Optionally, the mapping relationship that the modulation symbol satisfies with the first data and/or the second data is one of the following:

$\tilde{Q}=1/\sqrt{2}\times[(1-2\tilde{b}_0)+j(1-2\tilde{b}_0)]$, where $\tilde{b}_0$ is a first real number included in the first data, $\tilde{Q}$ is the modulation symbol, and j is an imaginary unit; or $\tilde{Q}=1/\sqrt{2}\times[(1-2\tilde{b}_0)+j(1-2\tilde{b}_1)]$, where $\tilde{b}_0$ and $\tilde{b}_1$ are two first real numbers included in the first data, $\tilde{Q}$ is the modulation symbol, and j is an imaginary unit; or $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where $\tilde{b}_0, \tilde{b}_1, \tilde{b}_2$, and $\tilde{b}_3$ are four first real numbers included in the first data, $\tilde{Q}$ is the modulation symbol, and j is an imaginary unit; or $\tilde{Q}=1/\sqrt{42}\times\{(1\times2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where $\tilde{b}_0, \tilde{b}_1, \tilde{b}_2, \tilde{b}_3, \tilde{b}_4$, and $\tilde{b}_5$ are six first real numbers included in the first data, $\tilde{Q}$ is the modulation symbol, and j is an imaginary unit; or $\tilde{Q}=1/\sqrt{2}\times[\tilde{a}_0+j\tilde{a}_0]$, where $\tilde{a}_0$ is a second real number included in the second data, $\tilde{Q}$ is the modulation symbol, and j is an imaginary unit; or $\tilde{Q}=1/\sqrt{2}\times[\tilde{a}_0+j\tilde{a}_1]$, where $\tilde{a}_0$ and $\tilde{a}_1$ are two second real numbers included in the second data, $\tilde{Q}$ is the modulation symbol, and j is an imaginary unit; or $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, where $\tilde{a}_0, \tilde{a}_1, \tilde{a}_2$, and $\tilde{a}_3$ are four second real numbers included in the second data, $\tilde{Q}$ is the modulation symbol, and j is an imaginary unit; or $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where $\tilde{a}_0, \tilde{a}_1, \tilde{a}_2, \tilde{a}_3, \tilde{a}_4$, and $\tilde{a}_5$ are six second real numbers included in the second data, $\tilde{Q}$ is the modulation symbol, and j is an imaginary unit; or $\tilde{Q}=1/\sqrt{2}[(1-2\tilde{b}_0)+j\tilde{a}_1]$, where $\tilde{b}_0$ is a first real number included in the first data, $\tilde{a}_1$ is a second real number included in the second data, $\tilde{Q}$ is the modulation symbol, and j is an imaginary unit; or $\tilde{Q}=1/\sqrt{10}\times\{(1-2\tilde{b}_0)[2-\tilde{a}_2]+j(1-2\tilde{b}_1)[2-\tilde{a}_3]\}$, where $\tilde{b}_0$ and $\tilde{b}_1$ are two first real numbers included in the first data, $\tilde{a}_2$ and $\tilde{a}_3$ are two second real numbers included in the second data, $\tilde{Q}$ is the modulation symbol, and j is an imaginary unit.

Optionally, the first data further includes one or more third real numbers, and the third real number is equal to 0 or 1. The second data further includes one or more fourth real numbers, and the fourth real number is equal to −1 or 1. Further optionally, the mapping relationship that the modulation symbol satisfies with the first data and/or the second data is one of the following:

$\tilde{Q}=1/\sqrt{2}\times[(1-2\tilde{b}_0)+j(1-2\tilde{b}_1)]$, where one of $\tilde{b}_0$ and $\tilde{b}_1$ is a first real number included in the first data, the other one is a third real number included in the first data, $\tilde{Q}$ is the modulation symbol, and j is an imaginary unit; or $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, where a part of $\tilde{b}_0$, $\tilde{b}_1$, $\tilde{b}_2$, and $\tilde{b}_3$ is a first real number included in the first data, the other part is a third real number included in the first data, $\tilde{Q}$ is the modulation symbol, and j is an imaginary unit; or $\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, where a part of $\tilde{b}_0$, $\tilde{b}_1$, $\tilde{b}_2$, $\tilde{b}_3$, $\tilde{b}_4$, and $\tilde{b}_5$ is a first real number included in the first data, the other part is a third real number included in the first data, $\tilde{Q}$ is the modulation symbol, and j is an imaginary unit; or $\tilde{Q}=1/\sqrt{2}\times[\tilde{a}_0+j\tilde{a}_1]$, where one of $\tilde{a}_0$ and $\tilde{a}_1$ is a second real number included in the second data, the other one is a fourth real number included in the second data, $\tilde{Q}$ is the modulation symbol, and j is an imaginary unit; or $\tilde{Q}=1/\sqrt{10}\times\{(2\tilde{a}_0-\tilde{a}_0\tilde{a}_2)+(2\tilde{a}_1-\tilde{a}_1\tilde{a}_3)\}$, where a part of $\tilde{a}_0$, $\tilde{a}_1$, $\tilde{a}_2$, and $\tilde{a}_3$ is a second real number included in the second data, the other part is a fourth real number included in the second data, $\tilde{Q}$ is the modulation symbol, and j is an imaginary unit; or $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, where a part of $\tilde{a}_0$, $\tilde{a}_1$, $\tilde{a}_2$, $\tilde{a}_3$, $\tilde{a}_4$, and $\tilde{a}_5$ is a second real number included in the second data, the other part is a fourth real number included in the second data, $\tilde{Q}$ is the modulation symbol, and j is an imaginary unit.

In the foregoing implementation provided in this embodiment of this application, the soft modulation may be implemented by using a modulation scheme of BPSK, QPSK, 16QAM, or 64QAM, thereby reducing implementation complexity of the soft modulation.

Optionally, the processing module 1602 quantizes the third data to obtain the first data and/or the second data. According to the implementation provided in this embodiment of this application, original soft information obtained by the forwarding node and that has a relatively large value range may be mapped to an interval with a relatively small value range, so that modulation complexity can be reduced.

Optionally, the processing module 1602 obtains the first data and/or the second data based on the third data. The third data and the first data satisfy $\tilde{b}_i=e^L/(1+e^L)$, where L is the third data, and $\tilde{b}_1$ is the first data. The third data and the second data satisfy $\tilde{a}_i=-\tan h(L/2)$, where L is the third data, and $\tilde{a}_i$ is the second data.

Optionally, the transceiver module 1601 receives control information, and the processing module 1602 determines, based on the control information, to generate the modulation symbol based on the first data and/or the second data. Further optionally, the processing module 1602 further determines, based on a code check result, to generate the modulation symbol based on the first data and/or the second data. In an implementation of the foregoing control information, the control information includes modulation scheme indication information and/or identification information of the communications device 1600. The identification information of the communications device 1600 indicates the communications device 1600, and the modulation scheme indication information indicates to generate the modulation symbol based on the first data and/or the second data. Optionally, the control information is included in one or more of a reserved field, a modulation and coding scheme indication field, or a bandwidth part (BWP) indication field in downlink control information (DCI). In the foregoing implementation provided in this embodiment of this application, when hard modulation and soft modulation coexist, the communications device can be notified to use a proper modulation scheme, thereby improving robustness of data sending.

Optionally, the modules in the communications apparatus 1600 in this embodiment of this application may be further configured to perform the method described in FIG. 11 in the embodiments of this application. For descriptions of performing the method corresponding to FIG. 11 by the modules, refer to the descriptions of performing the method corresponding to FIG. 4 by the modules. Details are not described herein again.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communications apparatus (for example, a base station, a terminal, a network entity, or a chip) may be implemented in one or more general purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

A person of ordinary skill in the art may understand that various reference numerals such as "first" and "second" in this application are merely used for differentiation for ease of description, and are not used to limit the scope of the embodiments of this application, or represent a sequence. "and/or" describes an association relationship between associated objects and represents that three relationships may exist. For example, A and/or B may represent three cases: There is only A, there are both A and B, and there is only B. The character "/" generally represents an "or" relationship between the associated objects. "At least one" means one or more. The at least two means two or more. "At least one", "any one", or a similar expression thereof means any combination of these items, including a singular item (piece) or any combination of plural items (pieces). For example, at least one (piece, or type) of a, b, or c may indicate: a, b, c, a-b, a-c, b-c, or a-b-c, where a, b, and c may be singular or plural.

Steps of the methods or algorithms described in the embodiments of this application may be directly embedded in hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. Alternatively, the memory may alternatively be integrated into a processor. The processor and the memory may be disposed in an ASIC, and the ASIC may be disposed in a terminal. Optionally, the processor and the memory may alternatively be disposed in different components of the terminal.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to various embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like. The foregoing combination should also be included in the protection scope of the computer-readable medium.

For same or similar parts in the embodiments of this specification, refer to each other. The foregoing implementations of this application are not intended to limit the protection scope of this application.

What is claimed is:

1. An apparatus, comprising:
   one or more processors;
   a non-transitory memory coupled to the one or more processors, wherein the non-transitory memory stores computer readable instructions that, when executed by the one or more processors, cause the apparatus to perform the following steps:
   receiving control information:
   determining, based on the control information, to generate a modulation symbol based on at least one of first data or second data:
   generating the modulation symbol based on at least one of the first data or the second data, wherein the modulation symbol satisfies a mapping relationship with at least one of the first data or the second data, the first data comprises one or more first real numbers, the one or more first real numbers are greater than 0 and less than 1, the second data comprises one or more second real numbers, and the one or more second real number are greater than −1 and less than 1;
   preprocessing the modulation symbol to obtain fourth data, wherein the preprocessing comprises one or more of layer mapping, antenna port mapping, precoding, or transform precoding;
   mapping the fourth data to a physical resource; and
   sending the fourth data by way of the physical resource.

2. The apparatus according to claim 1, wherein generating the modulation symbol based on at least one of the first data or the second data comprises:
   inputting the first data or the second data; and
   generating the modulation symbol.

3. The apparatus according to claim 1, wherein the mapping relationship comprises:
   $\tilde{Q}=1/\sqrt{2}\times[(1-2\tilde{b}_0)+j(1-2\tilde{b}_0)]$, wherein $\tilde{b}_0$ is a first real number included in the first data, $\tilde{Q}$ is the modulation symbol, and $j$ is an imaginary unit;
   $\tilde{Q}=1/\sqrt{2}\times[(1-2\tilde{b}_0)+j(1-2\tilde{b}_1)]$, wherein $\tilde{b}_0$ and $\tilde{b}_1$ are two first real numbers included in the first data, $\tilde{Q}$ is the modulation symbol, and $j$ is an imaginary unit;
   $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, wherein $\tilde{b}_0$, $\tilde{b}_1$, $\tilde{b}_2$, and $\tilde{b}_3$ are four first real numbers included in the first data, Q is the modulation symbol, and $j$ is an imaginary unit;
   $\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, wherein $\tilde{b}_0$, $\tilde{b}_1$, $\tilde{b}_2$, $\tilde{b}_3$, $\tilde{b}_4$, and $\tilde{b}_5$ are six first real numbers included in the first data, $\tilde{Q}$ is the modulation symbol, and $j$ is an imaginary unit;
   $\tilde{Q}=1/\sqrt{2}\times[\tilde{a}_0+j\tilde{a}_0]$, wherein $\tilde{a}_0$ is a second real number included in the second data, $\tilde{Q}$ is the modulation symbol, and $j$ is an imaginary unit;
   $\tilde{Q}=1/\sqrt{2}\times[\tilde{a}_0+j\tilde{a}_1]$, wherein $\tilde{a}_0$ and $\tilde{a}_1$ are two second real numbers included in the second data, $\tilde{Q}$ is the modulation symbol, and $j$ is an imaginary unit;
   $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, wherein $\tilde{a}_0$, $\tilde{a}_1$, $\tilde{a}_2$, and $\tilde{a}_3$ are four second real numbers included in the second data, $\tilde{Q}$ is the modulation symbol, and $j$ is an imaginary unit;
   $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, wherein $\tilde{a}_0$, $\tilde{a}_1$, $\tilde{a}_2$, $\tilde{a}_3$, $\tilde{a}_4$, and $\tilde{a}_5$ are six second real numbers included in the second data, $\tilde{Q}$ is the modulation symbol, and $j$ is an imaginary unit;
   $\tilde{Q}=1/\sqrt{2}\times[(1-2\tilde{b}_0)+j\tilde{a}_1]$, wherein $\tilde{b}_0$ is a first real number included in the first data, $\tilde{a}_1$ is a second real number included in the second data, $\tilde{Q}$ is the modulation symbol, and $j$ is an imaginary unit; or
   $\tilde{Q}=1/\sqrt{10}\times\{(1-2\tilde{b}_0)[2-\tilde{a}_2]+j(1-2\tilde{b}_1)[2-\tilde{a}_3]\}$, wherein $\tilde{b}_0$ and $\tilde{b}_1$ are two first real numbers included in the first data, $\tilde{a}_2$ and $\tilde{a}_3$ are two second real numbers included in the second data, $\tilde{Q}$ is the modulation symbol, and $j$ is an imaginary unit.

4. The apparatus according to claim 1, wherein the apparatus is further caused to perform:
   quantizing third data to obtain at least one of the first data or the second data.

5. The apparatus according to claim 1, wherein the apparatus is further caused to perform:
  obtaining at least one of the first data or the second data based on third data, wherein:
    the third data and the first data satisfy $\tilde{b}_i=e^L/(1+e^L)$, where L is the third data, and $\tilde{b}_i$ is the first data; and
    the third data and the second data satisfy $\tilde{a}_i=-\tan h(L/2)$, where L is the third data, and $\tilde{a}_i$ is the second data.

6. The apparatus according to claim 1, wherein determining, based on the control information, to generate the modulation symbol based on at least one of the first data or the second data comprises:
  determining, based on the control information and a code check result, to generate the modulation symbol based on at least one of the first data or the second data.

7. A method, comprising:
  receiving control information;
  determining, based on the control information, to generate a modulation symbol based on at least one of first data or second data;
  generating the modulation symbol based on at least one of the first data or the second data, wherein the modulation symbol satisfies a mapping relationship with at least one of the first data or the second data, the first data comprises one or more first real numbers, the one or more first real numbers are greater than 0 and less than 1, the second data comprises one or more second real numbers, the one or more second real numbers are greater than −1 and less than 1;
  preprocessing the modulation symbol to obtain fourth data, wherein the preprocessing comprises one or more of layer mapping, antenna port mapping, precoding, or transform precoding;
  mapping the fourth data to a physical resource; and
  sending the fourth data by way of the physical resource.

8. The method according to claim 7, wherein generating the modulation symbol based on at least one of the first data or the second data comprises:
  inputting the first data or the second data; and
  generating the modulation symbol.

9. The method according to claim 7, wherein the mapping relationship comprises:
  $\tilde{Q}=1/\sqrt{2}\times[(1-2\tilde{b}_0)+j(1-2\tilde{b}_0)]$, wherein $\tilde{b}_0$ is a first real number included in the first data, $\tilde{Q}$ is the modulation symbol, and j is an imaginary unit;
  $\tilde{Q}=1/\sqrt{2}\times[(1-2\tilde{b}_0)+j(1-2\tilde{b}_1)]$, wherein $\tilde{b}_0$ and $\tilde{b}_1$ are two first real numbers included in the first data, $\tilde{Q}$ is the modulation symbol, and j is an imaginary unit;
  $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, wherein $\tilde{b}_0$, $\tilde{b}_1$, $\tilde{b}_2$, and $\tilde{b}_3$ are four first real numbers included in the first data, Q is the modulation symbol, and j is an imaginary unit;
  $\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, wherein $\tilde{b}_0$, $\tilde{b}_1$, $\tilde{b}_2$, $\tilde{b}_3$, $\tilde{b}_4$, and $\tilde{b}_5$ are six first real numbers included in the first data, $\tilde{Q}$ is the modulation symbol, and j is an imaginary unit;
  $\tilde{Q}=1/\sqrt{2}\times[\tilde{a}_0+j\tilde{a}_0]$, wherein $\tilde{a}_0$ is a second real number included in the second data, $\tilde{Q}$ is the modulation symbol, and j is an imaginary unit;
  $\tilde{Q}=1/\sqrt{2}\times[\tilde{a}_0+j\tilde{a}_1]$, wherein $\tilde{a}_0$ and $\tilde{a}_1$ are two second real numbers included in the second data, $\tilde{Q}$ is the modulation symbol, and j is an imaginary unit;
  $\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, wherein $\tilde{a}_0$, $\tilde{a}_1$, $\tilde{a}_2$, and $\tilde{a}_3$ are four second real numbers included in the second data, $\tilde{Q}$ is the modulation symbol, and j is an imaginary unit;
  $\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, wherein $\tilde{a}_0$, $\tilde{a}_1$, $\tilde{a}_2$, $\tilde{a}_3$, $\tilde{a}_4$, and $\tilde{a}_5$ are six second real numbers included in the second data, $\tilde{Q}$ is the modulation symbol, and j is an imaginary unit;
  $\tilde{Q}=1/\sqrt{2}\times[(1-2\tilde{b}_0)+j\tilde{a}_1]$, wherein $\tilde{b}_0$ is a first real number c included in the first data, $\tilde{a}_1$ is a second real number included in the second data, $\tilde{Q}$ is the modulation symbol, and j is an imaginary unit; or
  $\tilde{Q}=1/\sqrt{10}\times\{(1-2\tilde{b}_0)[2-\tilde{a}_2]+j(1-2\tilde{b}_1)[2-\tilde{a}_3]\}$, wherein $\tilde{b}_0$ and $\tilde{b}_1$ are two first real numbers included in the first data, $\tilde{a}_2$ and $\tilde{a}_3$ are two second real numbers included in the second data, $\tilde{Q}$ is the modulation symbol, and j is an imaginary unit.

10. The method according to claim 7, further comprising:
  quantizing third data to obtain at least one of the first data or the second data.

11. The method according to claim 7, further comprising:
  obtaining at least one of the first data or the second data based on third data, wherein:
    the third data and the first data satisfy $\tilde{b}_i=e^L/(1+e^L)$, where L is the third data, and $\tilde{b}_i$ is the first data; and
    the third data and the second data satisfy $\tilde{a}_i=-\tan h(L/2)$, where L is the third data, and $\tilde{a}_i$ is the second data.

12. A non-transitory computer readable medium having instructions stored thereon that, when executed by one or more processors, cause an apparatus to perform the following steps:
  receiving control information;
  determining, based on the control information, to generate a modulation symbol based on at least one of first data or second data;
  generating the modulation symbol based on at least one of the first data or the second data, wherein the modulation symbol satisfies a mapping relationship with at least one of the first data or the second data;
  the first data comprises one or more first real numbers, the one or more first real numbers are greater than 0 and less than 1, the second data comprises one or more second real numbers, the one or more second real numbers are greater than −1 and less than 1;
  preprocessing the modulation symbol to obtain fourth data, wherein the preprocessing comprises one or more of layer mapping, antenna port mapping, precoding, or transform precoding;
  mapping the fourth data to a physical resource; and
  sending the fourth data by way of the physical resource.

13. The non-transitory computer readable medium according to claim 12, wherein generating the modulation symbol based on at least one of the first data or the second data comprises:
  inputting the first data or the second data; and
  generating the modulation symbol.

14. The non-transitory computer readable medium according to claim 12, wherein the mapping relationship comprises:
  $\tilde{Q}=1/\sqrt{2}\times[(1-2\tilde{b}_0)+j(1-2\tilde{b}_0)]$, wherein $\tilde{b}_0$ is a first real number included in the first data, $\tilde{Q}$ is the modulation symbol, and j is an imaginary unit;
  $\tilde{Q}=1/\sqrt{2}\times[(1-2\tilde{b}_0)+j(1-2\tilde{b}_1)]$, wherein $\tilde{b}_0$ and $\tilde{b}_1$ are two first real numbers included in the first data, $\tilde{Q}$ is the modulation symbol, and j is an imaginary unit;
  $\tilde{Q}=1/\sqrt{10}\times\{(1-2\tilde{b}_0)[2-(1-2\tilde{b}_2)]+j(1-2\tilde{b}_1)[2-(1-2\tilde{b}_3)]\}$, wherein $\tilde{b}_0$, $\tilde{b}_1$, $\tilde{b}_2$, and $\tilde{b}_3$ are four first real numbers included in the first data, $\tilde{Q}$ is the modulation symbol, and j is an imaginary unit;

$\tilde{Q}=1/\sqrt{42}\times\{(1-2\tilde{b}_0)[4-(1-2\tilde{b}_2)[2-(1-2\tilde{b}_4)]]+j(1-2\tilde{b}_1)[4-(1-2\tilde{b}_3)[2-(1-2\tilde{b}_5)]]\}$, wherein $\tilde{b}_0$, $\tilde{b}_1$, $\tilde{b}_2$, $\tilde{b}_3$, $\tilde{b}_4$, and $\tilde{b}_5$ are six first real numbers included in the first data, $\tilde{Q}$ is the modulation symbol, and j is an imaginary unit;

$\tilde{Q}=1/\sqrt{2}\times[\tilde{a}_0+j\tilde{a}_0]$, wherein $\tilde{a}_0$ is a second real number included in the second data, $\tilde{Q}$ is the modulation symbol, and j is an imaginary unit;

$\tilde{Q}=1/\sqrt{2}\times[\tilde{a}_0+j\tilde{a}_1]$, wherein $\tilde{a}_0$ and $\tilde{a}_1$ are two second real numbers included in the second data, $\tilde{Q}$ is the modulation symbol, and j is an imaginary unit;

$\tilde{Q}=1/\sqrt{10}\times\{(2\tilde{a}_0-\tilde{a}_0\tilde{a}_2)+j(2\tilde{a}_1-\tilde{a}_1\tilde{a}_3)\}$, wherein $\tilde{a}_0$, $\tilde{a}_1$, $\tilde{a}_2$, and $\tilde{a}_3$ are four second real numbers included in the second data, $\tilde{Q}$ is the modulation symbol, and j is an imaginary unit;

$\tilde{Q}=1/\sqrt{42}\times\{(4\tilde{a}_0-2\tilde{a}_0\tilde{a}_2+\tilde{a}_0\tilde{a}_2\tilde{a}_4)+j(4\tilde{a}_1-2\tilde{a}_1\tilde{a}_3+\tilde{a}_1\tilde{a}_3\tilde{a}_5)\}$, wherein $\tilde{a}_0$, $\tilde{a}_1$, $\tilde{a}_2$, $\tilde{a}_3$, $\tilde{a}_4$, and $\tilde{a}_5$ are six second real numbers included in the second data, Q is the modulation symbol, and j is an imaginary unit;

$\tilde{Q}=1/\sqrt{2}\times[(1-2\tilde{b}_0)+j\tilde{a}_1]$, wherein $\tilde{b}_0$ is a first real number included in the first data, $\tilde{a}_1$ is a second real number included in the second data, $\tilde{Q}$ is the modulation symbol, and j is an imaginary unit; or $\tilde{Q}=1/\sqrt{10}\times\{(1-2\tilde{b}_0)[2-\tilde{a}_2]+j(1-2\tilde{b}_1)[2-\tilde{a}_3]\}$, wherein $\tilde{b}_0$ and $\tilde{b}_1$ are two first real numbers included in the first data, $\tilde{a}_2$ and $\tilde{a}_3$ are two second real numbers included in the second data, $\tilde{Q}$ is the modulation symbol, and j is an imaginary unit.

15. The non-transitory computer readable medium according to claim 12, wherein the apparatus is further caused to perform:

quantizing third data to obtain at least one of the first data or the second data.

16. The non-transitory computer readable medium according to claim 12, wherein the apparatus is further caused to perform:

obtaining at least one of the first data or the second data based on third data, wherein:

the third data and the first data satisfy $\tilde{b}_i=e^L/(1+e^L)$, where L is the third data, and $\tilde{b}_i$ is the first data; and the third data and the second data satisfy $\tilde{a}_i=-\tanh(L/2)$, where L is the third data, and $\tilde{a}_i$ is the second data.

17. The non-transitory computer readable medium according to claim 12, wherein determining, based on the control information, to generate the modulation symbol based on at least one of the first data or the second data comprises:

determining, based on the control information and a code check result, to generate the modulation symbol based on at least one of the first data or the second data.

* * * * *

UNITED STATES PATENT AND TRADEMARK OFFICE
CERTIFICATE OF CORRECTION

PATENT NO. : 11,431,541 B2  
APPLICATION NO. : 17/232430  
DATED : August 30, 2022  
INVENTOR(S) : Pengpeng Dong Page 1 of 1

It is certified that error appears in the above-identified patent and that said Letters Patent is hereby corrected as shown below:

In the Specification (A) Column 18, Line 59 should be replaced with:
third data in part 400, the third data and the second data satisfy $\tilde{a}_i = -\tanh(L/2)$, where $L$ is (B) Column 20, Lines 1-2 should be replaced with:
and the third data and the second data satisfy $\tilde{a}_i = -\tanh(L/2)$, where $L$ is the third data (which (C) Column 38, Lines 36-39 should be replaced with:
$$\tilde{Q} = 1/\sqrt{42} \times \{(1-2\tilde{b}_0)[4-(1-2\tilde{b}_2)[2-(1-2\tilde{b}_4)]] + j(1-2\tilde{b}_1)[4-(1-2\tilde{b}_3)[2-(1-2\tilde{b}_5)]]\}$$
, where a part of $\tilde{b}_0, \tilde{b}_1, \tilde{b}_2, \tilde{b}_3, \tilde{b}_4$, and $\tilde{b}_5$ is a first real number included in the first data, the other part is a third real number included in the first data, $\tilde{Q}$ is the modulation symbol, and $j$ is an imaginary unit; or In the Claims (D) Column 42, Lines 33-36 in Claim 3 should be replaced with:
$$\tilde{Q} = 1/\sqrt{10} \times \{(1-2\tilde{b}_0)[2-(1-2\tilde{b}_2)] + j(1-2\tilde{b}_1)[2-(1-2\tilde{b}_3)]\}$$
, wherein $\tilde{b}_0, \tilde{b}_1, \tilde{b}_2$, and $\tilde{b}_3$ are four first real numbers included in the first data, $\tilde{Q}$ is the modulation symbol, and $j$ is an imaginary unit;

(E) Column 45, Lines 14-17 in Claim 16 should be replaced with:
$$\tilde{Q} = 1/\sqrt{42} \times \{(4\tilde{a}_0 - 2\tilde{a}_0\tilde{a}_2 + \tilde{a}_0\tilde{a}_2\tilde{a}_4) + j(4\tilde{a}_1 - 2\tilde{a}_1\tilde{a}_3 + \tilde{a}_1\tilde{a}_3\tilde{a}_5)\}$$
, wherein $\tilde{a}_0, \tilde{a}_1, \tilde{a}_2, \tilde{a}_3, \tilde{a}_4$, and $\tilde{a}_5$ are six second real numbers included in the second data, $\tilde{Q}$ is the modulation symbol, and $j$ is an imaginary unit;

Signed and Sealed this  
Twenty-first Day of February, 2023

Katherine Kelly Vidal  
*Director of the United States Patent and Trademark Office*